(12) United States Patent
Tanaka

(10) Patent No.: US 7,692,862 B2
(45) Date of Patent: Apr. 6, 2010

(54) ZOOM LENS CAPABLE OF IMAGE STABILIZATION AND IMAGING APPARATUS

(75) Inventor: Takashi Tanaka, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 49 days.

(21) Appl. No.: 12/010,302

(22) Filed: Jan. 23, 2008

(65) Prior Publication Data

US 2008/0218861 A1    Sep. 11, 2008

(30) Foreign Application Priority Data

Mar. 9, 2007    (JP)    ............................ 2007-060783

(51) Int. Cl.
  *G02B 27/64*    (2006.01)
  *G02B 15/14*    (2006.01)
(52) U.S. Cl. ...................... 359/557; 359/554; 359/687; 359/676
(58) Field of Classification Search ......... 359/554–557, 359/676–690
  See application file for complete search history.

(56) References Cited

U.S. PATENT DOCUMENTS

| 6,002,519 | A | * | 12/1999 | Hayashi et al. | ............. 359/557 |
| 6,414,800 | B1 | | 7/2002 | Hamano | |
| 7,221,511 | B2 | * | 5/2007 | Toyama | ...................... 359/557 |
| 2001/0022696 | A1 | | 9/2001 | Nishio | |
| 2002/0024732 | A1 | | 2/2002 | Hamano et al. | |
| 2002/0063961 | A1 | | 5/2002 | Hamano et al. | |
| 2005/0083584 | A1 | | 4/2005 | Ito et al. | |
| 2005/0195482 | A1 | | 9/2005 | Yamada et al. | |
| 2005/0270646 | A1 | | 12/2005 | Yamada et al. | |

FOREIGN PATENT DOCUMENTS

| JP | 11-237550 | A | 8/1999 |
| JP | 2000-298235 | A | 10/2000 |
| JP | 3359131 | B2 | 10/2002 |
| JP | 3557344 | B2 | 5/2004 |

* cited by examiner

*Primary Examiner*—Thong Nguyen
(74) *Attorney, Agent, or Firm*—Birch, Stewart, Kolasch & Birch, LLP

(57) ABSTRACT

A zoom lens capable of image stabilization is provided and includes: in order from the object side, a positive first group fixed in variable magnification, a negative second group having a variable magnification function, a positive third group fixed in variable magnification, and a positive fourth group having a correction function for an image plane variation depending upon variable magnification and a focusing function. In the third group, there are arranged a positive 3a-th group, a negative 3b-th group, and a positive 3c-th group in this order from the object side. Blurring of a taken image caused by a vibration of this variable magnification optical system is corrected by moving the 3b-th group in a direction approximately orthogonal to the optical axis. Further, a specific conditional expression relating to power of the third group and a specific conditional expression relating to a power distribution of lens groups of the third group $G_3$ are satisfied.

17 Claims, 16 Drawing Sheets

EXAMPLE 1
(WIDE-ANGLE END)

EXAMPLE 1

EXAMPLE 1

TANGENTIAL DIRECTION
AT TELEPHOTO END

AT THE TIME OF NORMAL     AT THE TIME OF CORRECTING BLURRING AT 0.3°

Y = 1.27

Y = 0

Y = -1.27

EXAMPLE 2
(WIDE-ANGLE END)

EXAMPLE 2

WIDE-ANGLE END

MIDDLE

TELEPHOTO END

EXAMPLE 2

TANGENTIAL DIRECTION
AT TELEPHOTO END

AT THE TIME OF NORMAL       AT THE TIME OF CORRECTING BLURRING AT 0.3°

Y = 1.27

Y = 0

Y = -1.27

EXAMPLE 3
(WIDE-ANGLE END)

EXAMPLE 3

EXAMPLE 3

TANGENTIAL DIRECTION
AT TELEPHOTO END

AT THE TIME OF NORMAL     AT THE TIME OF CORRECTING BLURRING AT 0.3°

Y = 1.27

Y = 0

Y = -1.27

EXAMPLE 4
(WIDE-ANGLE END)

EXAMPLE 4

EXAMPLE 4

TANGENTIAL DIRECTION
AT TELEPHOTO END

AT THE TIME OF NORMAL        AT THE TIME OF CORRECTING BLURRING AT 0.3°

Y = 1.27

Y = 0

Y = -1.27

EXAMPLE 5
(WIDE-ANGLE END)

EXAMPLE 5

EXAMPLE 5

TANGENTIAL DIRECTION
AT TELEPHOTO END

AT THE TIME OF NORMAL | AT THE TIME OF CORRECTING BLURRING AT 0.3°

Y = 1.27

Y = 0

Y = -1.27

ZOOM LENS CAPABLE OF IMAGE STABILIZATION AND IMAGING APPARATUS

BACKGROUND OF THE INVENTION

1. Field of the Invention

The present invention relates to a zoom lens capable of image stabilization and an imaging apparatus, and more particularly to a zoom lens capable of image stabilization and an imaging apparatus equipped with the same, which are suitably used for a video camera or digital camera, particularly a 3 CCD video camera using three CCDs, so as to obtain a good image by moving a lens group of a part of a variable magnification optical system in a direction approximately orthogonal to an optical axis and optically correcting blurring of a taken image occurring when the variable magnification optical system vibrates (or tilts).

2. Description of Related Art

In imaging on a moving object such as a vehicle or handheld imaging under a condition of slow shutter speed, a taken image is blurred due to a hand shake when vibrations are transferred to an imaging optical system.

For this reason, an optical system capable of image stabilization, which has a function for preventing blurring of a taken image due to vibrations of the imaging optical system, has been variously proposed.

There is a well-known optical system for promoting image stabilization by moving a part of a lens group of an imaging optical system in a direction approximately orthogonal to an optical axis (for example, see Japanese Patent No. 3557344). The technique disclosed in Japanese Patent No. 3557344 includes a positive first lens group fixed in varying magnification, a negative second lens group having a variable magnification function, a positive third lens group fixed in varying magnification, and a positive fourth lens group having both a correction function for correcting an image plane variation with varying magnification and a focusing function, arranged in this order from the object side. When the variable magnification optical system vibrates, blurring of a taken image is corrected by moving the third lens group fixed in varying magnification in the direction approximately orthogonal to the optical axis for image stabilization.

However, in the above-described technique, the load of a lens drive system is heavy since the entire third lens group moves. In particular, in the zoom lens of a four-group constitution having positive, negative, positive and positive components corresponding to a 3 CCD system, the refractive power of the third lens group is relatively low to obtain a long back focus and a movement amount for image stabilization of a blurring correction group is necessarily large, such that the load of the lens drive system becomes heavier.

As described in the techniques of JP-A-11-237550, JP-A-2000-298235 and Japanese Patent No. 3359131, it is known that one group of a plurality of groups constituting the third lens group moves for image stabilization. In the JP-A-2000-298235, a five-group constitution of positive, negative, positive, negative and positive components in this order from the object side is disclosed. However, since a space between third and fourth groups is not varied in varying magnification and a combination of these two groups has positive refractive power as clearly shown in a conditional expression, the zoom lens having a four-group constitution of positive, negative, positive and positive components can be assumed.

As described above, the load of the lens drive system may be significantly reduced by moving one group of a plurality of lens groups constituting the third lens group without moving the entire third lens group for image stabilization. In particular, this is extremely effective in a zoom lens having a four-group constitution of positive, negative, positive and positive components corresponding to the 3 CCD system.

However, in JP-A-11-237550, the third lens group is formed by arranging a negative lens group and a positive lens group in this order from the object side and the positive lens group arranged on an image side is operable for image stabilization, such that a light flux is spread at a position of the positive lens group according to light flux divergence of the negative lens group of the object side and the positive lens group driven for image stabilization has an increased size and an increased weight. Consequently, there is a problem in that it is difficult to perform quick vibration isolation control at low power. At present, a small size and low power consumption are strongly required in a video camera or digital camera and the development of a lens system capable of performing quick vibration isolation control is required.

In JP-A-2000-298235, the third lens group is formed by arranging a negative lens group and a positive lens group in this order from the object side and the positive lens group arranged on the object side is operable for image stabilization. However, when the positive lens group moves for image stabilization, the refractive power of the positive lens group should be higher to suppress its movement amount, such that it is difficult to perform a sufficient aberration correction at the time of a blurring correction.

Also in embodiments described in Japanese Patent No. 3359131, the third lens group is constituted with a positive lens group and a negative lens group. There is the same problem as those of JP-A-11-237550 and JP-A-2000-298235 since the positive lens group moves in the direction approximately orthogonal to the optical axis for image stabilization.

SUMMARY OF THE INVENTION

An object of an illustrative, non-limiting embodiment of the invention is to provide a zoom lens and an imaging apparatus, which are suitable for a 3 CCD video camera or the like and which can reduce the load of an image stabilization drive system without damaging compact capability and can obtain good optical performance even when a large blurring (e.g., hand shake) occurs.

According to the present invention, there is provided a zoom lens capable of image stabilization comprising: in order from an object side of the zoom lens:

a first lens group having a positive refractive power, the first lens group being fixed when the zoom lens varies a magnification thereof;

a second lens group having a negative refractive power and being capable of varying a magnification of the zoom lens;

a stop;

a third lens group having a positive refractive power, the third lens group being fixed when the zoom lens varies a magnification thereof; and a fourth lens group having a positive refractive power, being capable of correcting an image plane variation when the zoom lens varies a magnification thereof, and being capable of focusing the zoom lens, wherein the third lens group includes a 3a-th lens group having a positive refractive power, a 3b-th lens group having a negative refractive power, and a 3c-th lens group having a positive refractive power in this order from the object side, the 3b-th lens group is adapted to be movable in a direction approximately orthogonal to an optical axis thereof so as to correct blurring of a taken image which is caused by a vibration of the zoom lens, and the zoom lens satisfies conditional expressions (1) and (2):

$$8 < f3/fw < 26 \quad (1)$$

$$0.55 < |(\phi 3a + \phi 3c)/(2 \times \phi 3b)| < 0.95 \quad (2)$$

wherein fw represents a focal length of the zoom lens at a wide angle end, f3 represents a focal length of the third lens group, $\phi 3a$ represents a refractive power of the 3a-th lens group, which is a reciprocal of a focal length of the 3a-th lens group, $\phi 3b$ represents a refractive power of the 3b-th lens group, which is reciprocal of a focal length of the 3b-th lens group, and $\phi 3c$ represents a refractive power of the 3c-th lens group, which is a reciprocal of a focal length of the 3c-th lens group.

The 3b-th lens group may be constituted with one single lens or one cemented lens and may have at least one aspherical surface.

When the 3b-th lens group is constituted with the one single lens, the one single lens may be a negative lens having a concave surface of strong curvature directed to the object side, and the following conditional expressions (3) and (4) are satisfied:

$$v_{3b} > 35 \quad (3)$$

$$n_{3b} > 1.75 \quad (4)$$

wherein $v_{3b}$ represents an Abbe number of a material of the one single lens at the d-line, and $n_{3b}$ represents a refractive index of the material of the one single lens at the d-line.

When the 3b-th lens group is constituted with the one cemented lens formed by cementing a positive lens and a negative lens, a most object-side surface of the cemented lens has a concave surface directed to the object and the following conditional expressions (5) and (6) are satisfied:

$$10 < v_{3bN} - v_{3bP} < 25 \quad (5)$$

$$(n_{3bN} + n_{3bP})/2 > 1.7 \quad (6)$$

wherein $v_{3bP}$ represents an Abbe number of a material of the positive lens at the d-line $v_{3bN}$ represents an Abbe number of a material of the negative lens at the d-line, $n_{3bP}$ represents a refractive index of the material of the positive lens at the d-line, and $n_{3bN}$ represents a refractive index of the material of the negative lens at the d-line.

At least one of the 3a-th lens group and the 3c-th lens group may be constituted with one plastic lens.

The following conditional expression (7) may be satisfied:

$$3 < Bfw/fw < 5.5 \quad (7)$$

wherein Bfw represents a back focus at a wide angle end when removing an optical member having no refractive power between an imaging plane and a surface of a lens closest to the imaging plane.

According to an aspect of the invention, there is provided an imaging apparatus including any zoom lens capable of image stabilization as described above.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Although the invention will be described below with reference to exemplary embodiments thereof, the following exemplary embodiments and modifications do not restrict the invention.

According to exemplary embodiments of a zoom lens capable of image stabilization and an imaging apparatus of the present invention, the third lens group is constituted with the 3a-th lens group having a positive refractive power, the 3b-th lens group having a negative refractive power, and the 3c-th lens group having a positive refractive power arranged in this order from the object side, such that blurring correction is performed by moving the 3b-th lens group of these groups in a direction almost orthogonal to the optical axis. Therefore, a relatively lightweight group can be set to a blurring correction group without damaging compact capability. Accordingly, good optical performance can be provided even when a large blurring (e.g., hand shake) occurs while reducing the load of an image stabilization drive system.

Specifically, the intermediate negative refractive power can be prevented from excessively increasing by making a so-called triplet constitution in which the entire third lens group is divided into portions of positive, negative, and positive refractive powers. A movement amount of the blurring correction group can be reasonably set to a more appropriate size than that of the case where the entire third lens group is divided into two positive and negative refractive powers. At this time, when the overall refractive power of the third lens group is relatively high, the eccentric performance is excessively degraded in the intermediate negative lens group but 3 CCD can be supported. In the zoom lens of a four-group constitution of positive, negative, positive and positive components, the degradation of the eccentric performance is reduced since the refractive power of the third lens group is relatively low.

Since a constitution is made to satisfy the conditional expression (1), a back focus length can be secured such that a color separation prism or the like can be inserted and the compact capability can be guaranteed since the entire lens length can be shortened.

Since a constitution is made to satisfy the above-described conditional expression (2), the 3b-th lens group can be simply constituted, such that the reduction of the entire length and the reduction of manufacturing cost can be promoted. Simultaneously, the compactification of an actuator or the like for driving the 3b-th lens group can be promoted by suppressing a movement amount of the 3b-th lens group required at the time of vibration isolation.

Figure 1:
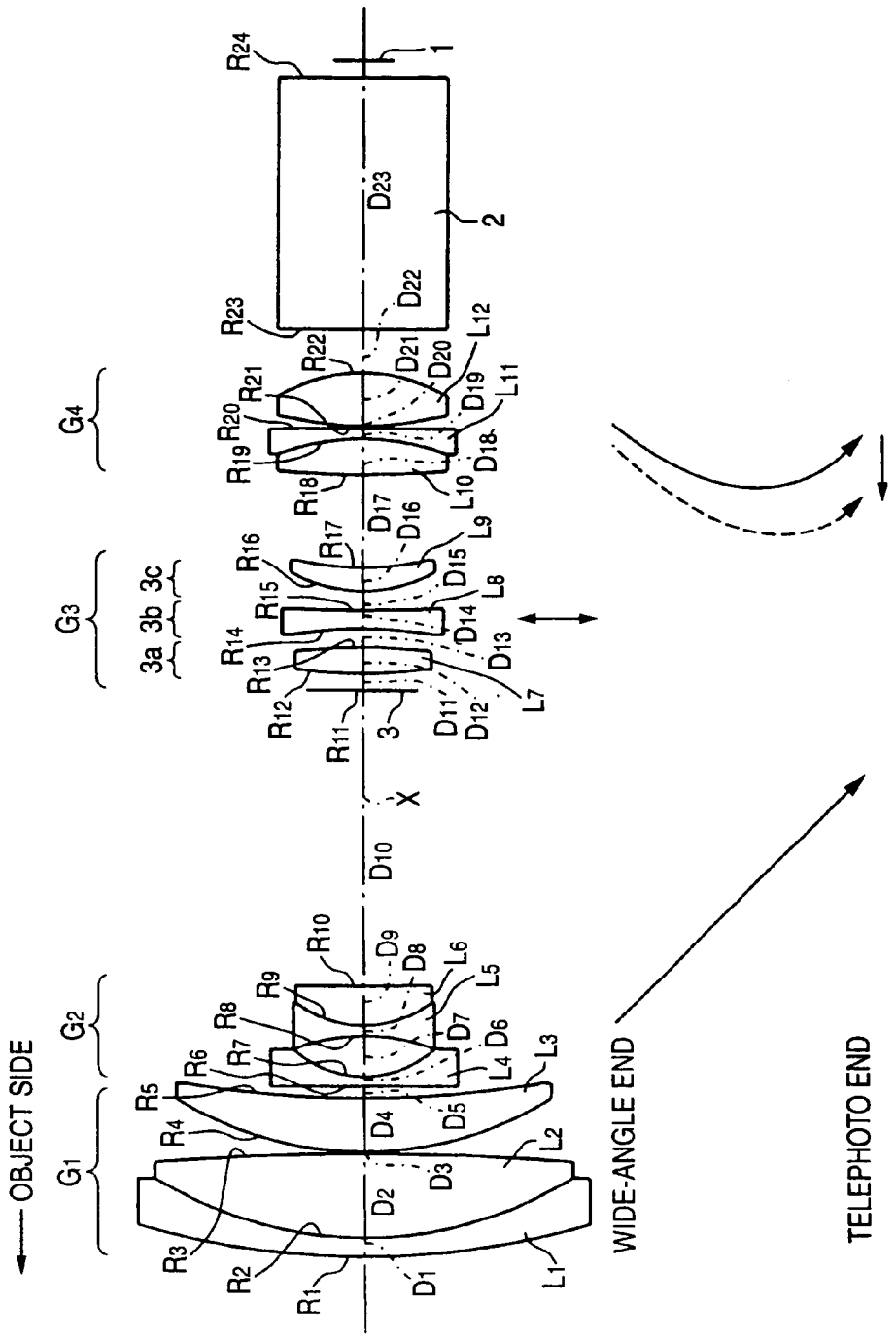
FIG. 1 is a lens constitution diagram of a zoom lens capable of image stabilization according to an example 1 of the present invention.

Hereinafter, a zoom lens capable of image stabilization according to an exemplary embodiment of the present invention will be described with reference to FIG. 1 showing an example 1 serving as a representative example.

A lower stage of FIG. 1 shows movement loci of lens groups from a wide angle end to a telephoto end (equal to those of FIG. 4, FIG. 7, FIG. 10, and FIG. 13). In the movement loci of a fourth lens group, the solid line indicates the movement locus at an infinite object distance and the dash line indicates the movement locus at a finite object distance.

A zoom lens capable of image stabilization according to an exemplary embodiment of the present invention is mainly mounted in a 3 CCD type video camera or the like. In order from an object side as shown in FIG. 1, there are arranged a first lens group $G_1$, fixed in variable magnification (i.e., when the zoom lens varies its magnification), having three lenses $L_1$, $L_2$, and $L_3$ and positive refractive power, a second lens group $G_2$ having a variable magnification function, three lenses $L_4$, $L_5$, and $L_6$ and negative refractive power, a third lens group $G_3$, fixed in variable magnification, having three lenses $L_7$, $L_8$, and $L_9$ (four lenses $L_7$, $L_8$, $L_9$, and $L_{10}$ in an example 2) and positive refractive power, and a fourth lens group $G_4$ having a correction function for an image plane variation depending upon variable magnification, a focusing function, three lenses $L_{10}$, $L_{11}$, and $L_{12}$ (three lenses $L_{11}$, $L_{12}$, and $L_{13}$ in the example 2) and positive refractive power.

Moreover, an aperture diaphragm 3 is arranged on the object side of the third lens group $G_3$. A color separation prism (including a filter section such as a low pass filter, an infrared cut filter, or the like) 2 serving an optical member without refractive power is provided between the fourth lens group $G_4$ and an imaging plane (or CCD imaging plane) 1. The aperture diaphragm 3 is unified with the third lens group $G_3$.

In the zoom lens capable of image stabilization, a focal length f of the entire system is varied by moving the second lens group $G_2$ along the optical axis X. The correction for an image plane variation depending upon variable magnification and focusing are performed by moving the fourth lens group $G_4$ along the optical axis X, such that a light flux efficiently converges on the imaging plane 1.

Moreover, the third lens group $G_3$ is constituted with a positive 3a-th lens group 3a, a negative 3b-th lens group 3b, and a positive 3c-th lens group 3c in this order from the object side. The 3a-th lens group 3a is constituted with only the seventh lens $L_7$, the 3b-th lens group 3b is constituted with only the eighth lens $L_8$, and the 3c-th lens group 3c is constituted with only the ninth lens $L_9$ (and, in the example 2, the 3a-th lens group 3a is constituted with only the seventh lens $L_7$, the 3b-th lens group 3b is constituted with only the eighth lens $L_8$ and the ninth lens $L_9$ and the 3c-th lens group 3c is constituted with only the tenth lens $L_{10}$).

In this embodiment, blurring of a taken image due to vibrations of the zoom lens system is corrected by moving (or vibrating) the eighth lens $L_8$ constituting the 3b-th lens group 3b (or a cemented lens of the eighth lens $L_8$ and the ninth lens $L_9$ constituting the 3b-th lens group 3b in the example 2) in the direction approximately orthogonal to the optical axis X.

Specifically, for example, a storage device incorporated in advance within a camera or the like stores an axis shift amount of the 3b-th lens group 3b for correcting blurring. A blurring amount is detected using an angular rate sensor arranged on the camera side. Using an actuator arranged on the zoom lens system, the 3b-th lens group 3b is shifted by the axis shift amount corresponding to the blurring amount in the direction approximately orthogonal to the optical axis X.

As described above, the third lens group $G_3$ is constituted by arranging the positive 3a-th lens group 3a, the negative 3b-th lens group 3b, and the positive 3c-th lens group 3c in this order from the object side. The entire third lens group $G_3$ is constituted in a so-called triplet structure including the positive lens, the negative lens, and the positive lens, such that the refractive power of the intermediate negative lens (3b) can be prevented from excessively increasing and a movement amount of the blurring correction lens (3b) for image stabilization can appropriately increase.

When the overall refractive power of the third lens group $G_3$ is relatively high, the eccentric performance is excessively degraded in the intermediate negative lens of the third lens group $G_3$. However, since the refractive power of the third lens group $G_3$ is relatively small in the zoom lens of the four-group constitution having positive, negative, positive and positive components of a 3 CCD adaptive type, the degradation of the eccentric performance is reduced and any problem does not substantially occur.

The 3b-th lens group 3b to be driven for image stabilization is constituted with the negative lens and the 3a-th lens group 3a and the 3c-th lens group 3c respectively having the positive refractive power are placed on the object side and the image side of the 3b-th lens group 3b. Accordingly, since the spread of the light flux is reduced at the position of the 3b-th lens group 3b, the small size and light weight of the 3b-th lens group 3b can be implemented and quick image stabilization control can be performed at low power.

Also in this embodiment, the 3b-th lens group 3b serving as the blurring correction group is constituted with one single lens (in embodiments 1, 3, 4, and 5) or one cemented lens (in the example 2). Moreover, at least one aspherical surface may be provided in the 3b-th lens group 3b. Accordingly, the 3b-th lens group 3b serving as the blurring correction group can be a relatively lightweight lens group and the burden of the image stabilization drive system can be reduced. The performance degradation can be reduced by moving the blurring correction group in the direction almost orthogonal to the optical axis.

When the 3b-th lens group 3b is constituted with one single lens, the single lens may be the negative lens having a concave surface directed to the object side. On the other hand, when the 3b-th lens group 3b is constituted with one cemented lens formed by cementing the positive lens and the negative lens, the most object-side surface of the cemented lens may have a concave surface directed to the object side. Accordingly, a long back focus can be secured in the triplet structure.

Moreover, an aspherical surface may be appropriately provided in other lens groups to promote the performance improvement.

At least one of the 3a-th lens group 3a and the 3c-th lens group 3c serving as the positive lenses may be constituted with one plastic lens in the following reason.

That is, since a lens barrel totally extends when a temperature is raised, a point of focus tends to be short shifted. On the other hand, when the lens is made of plastic, a refractive index of the plastic is small as the temperature is raised, such that its refractive power is lowered. This means that the plastic positive lens functions to displace the focus point to a distance when the temperature is raised. In this embodiment, the 3a-th lens group 3a and/or the 3c-th lens group 3c serving as the positive lenses are made of plastic, such that the shift of the focus point can be compensated for according to a shape variation of the lens barrel due to a temperature variation (and the 3c-th lens group 3c is made of plastic in the respective embodiments, but the 3a-th lens group 3a can be made of plastic).

Since the positive refractive power is distributed by the 3a-th lens group 3a and the 3c-th lens group 3c and the refractive power of each lens is low, an issue occurring when the lens is made of plastic is suppressible. Since the plastic is used, an advantage of cost-effectiveness is provided.

Moreover, the zoom lens capable of image stabilization of this embodiment satisfies the above-described conditional expressions (1) and (2). Also the respective conditional expressions (3) to (7) as described above may be appropriately satisfied.

Next, the technical meanings of the respective conditional expressions (1) to (7) as described above will be described.

First, the conditional expression (1) defines a range of a value of a ratio of the refractive power of the entire system at the wide angle end to the refractive power of the third lens group $G_3$. At the time of falling below a lower limit of the conditional expression (1), the refractive power of the third lens group $G_3$ becomes excessively high, such that it is difficult to secure a back focus for inserting a color separation prism or the like. On the other hand, at the time of exceeding an upper limit of the conditional expression (1), the refractive power of the third lens group $G_3$ becomes excessively low, such that the reduction of the entire lens length is difficult and the compact capability is lost.

The conditional expression (2) defines a range of a distribution of the average refractive power of the 3a-th lens group 3a and the 3c-th lens group 3c of the third lens group $G_3$ and the refractive power of the 3b-th lens group 3b. At the time of falling below a lower limit of the conditional expression (2), the refractive power of the 3b-th lens group 3b becomes excessively high and the performance degradation due to its eccentricity increases, such that it is difficult to simply constitute the 3b-th lens group 3b and reduce the entire lens length, thereby resulting in an increase in cost.

On the other hand, at the time of exceeding an upper limit of the conditional expression (2), the refractive power of the 3b-th lens group 3b is low and a movement amount of the 3b-th lens group 3b required at the time of vibration isolation is excessively large, a size of the actuator for driving the 3b-th lens group 3b or the like increases. The refractive powers of the 3a-th lens group 3a and/or the 3c-th lens group 3c are excessively high, and the focus shift to the temperature variation excessively increases when any plastic is used.

It may be preferable to satisfy the above-described conditional expression (3). The conditional expression (3) defines an Abbe number at the d-line of the single lens constituting the 3b-th lens group 3b of the third lens group $G_3$. At the time of falling below a lower limit of the conditional expression (3), the Abbe number of the single lens constituting the 3b-th lens group 3b is excessively small. When the 3b-th lens group 3b moves in the direction almost orthogonal to the optical axis, a color shift occurs and the performance degradation increases.

It may be preferable to satisfy the above-described conditional expression (4). The conditional expression (4) defines a refractive index at the d-line of the single lens constituting the 3b-th lens group 3b of the third lens group $G_3$. At the time of falling below a lower limit of the conditional expression (4), the refractive index of the single lens constituting the 3b-th lens group 3b is small, such that a negative Petzval sum is excessively large and the correction of filed curvature is difficult.

It may be preferable to satisfy the above-described conditional expression (5). The conditional expression (5) defines a difference between Abbe numbers at the d-lines of the positive lens and the negative lens serving as the components of the cemented lens constituting the 3b-th lens group 3b of the third lens group $G_3$. At the time of falling below a lower limit of the conditional expression (5), the Abbe number difference between the positive lens and the negative lens constituting the 3b-th lens group 3b is excessively small, such that the color aberration correction in the 3b-th lens group 3b is insufficient, the color shift occurs when the 3b-th lens group 3b moves in the direction almost orthogonal to the optical axis, and the performance degradation excessively increases. On the other hand, at the time of exceeding an upper limit of the conditional expression (5), the Abbe number difference between the positive lens and the negative lens constituting the 3b-th lens group 3b is excessively large, such that the color aberration correction in the 3b-th lens group 3b is surplus, the color shift occurs when the 3b-th lens group 3b moves in the direction almost orthogonal to the optical axis, and the performance degradation excessively increases.

It may be preferable to satisfy the above-described conditional expression (6). The conditional expression (6) defines an average value between refractive indices at the d-lines of the positive lens and the negative lens serving as the components of the cemented lens constituting the 3b-th lens group 3b of the third lens group $G_3$. At the time of falling below a lower limit of the conditional expression (6), the refractive index of the negative lens constituting the 3b-th lens group 3b is small. Consequently, the negative Petzval sum excessively increases and the correction of field curvature is difficult.

It may be preferable to satisfy the above-described conditional expression (7). The conditional expression (7) is used to secure an appropriate back focus such that the color separation prism or the like is inserted. At the time of falling below a lower limit of the conditional expression (7), it is difficult to secure a sufficient space into which the color separation prism or the like is inserted. On the other hand, at the time of exceeding an upper limit of the conditional expression (7), the above-described back focus is sufficiently secured, but the reduction of the entire lens length is difficult and the compactification is difficult.

Herein, the object side surface of the eighth lens $L_8$, the object side surface or the image side surface of the ninth lens $L_9$ (or the object side surface of the tenth lens $L_{10}$ in the example 2), and both surfaces of the twelfth lens $L_{12}$ (or both surfaces of the thirteenth lens $L_{13}$ in the example 2) are formed in an aspherical surface shape represented by the below-described aspherical surface equation.

Therefore, the correction of spherical aberration is good and the stabilization of image quality can be promoted at the time of vibration isolation.

(Aspherical surface equation)

$$A = \frac{H^2/R}{1+\sqrt{1-K \times H^2/R^2}} + \sum_{i=3}^{12} A_i H^i$$

Herein,

Z represents the length of a vertical line dropped to the tangential plane (or the plane perpendicular to the optical axis) of an apex of the aspherical surface from a point on the aspherical surface at a distance Y from the optical axis, H represents the distance from the optical axis, R represents the curvature radius around the optical axis of the aspherical surface, K represents the eccentricity, and $A_i$ represents the aspherical surface coefficient (i=3 to 12).

Figure 16:
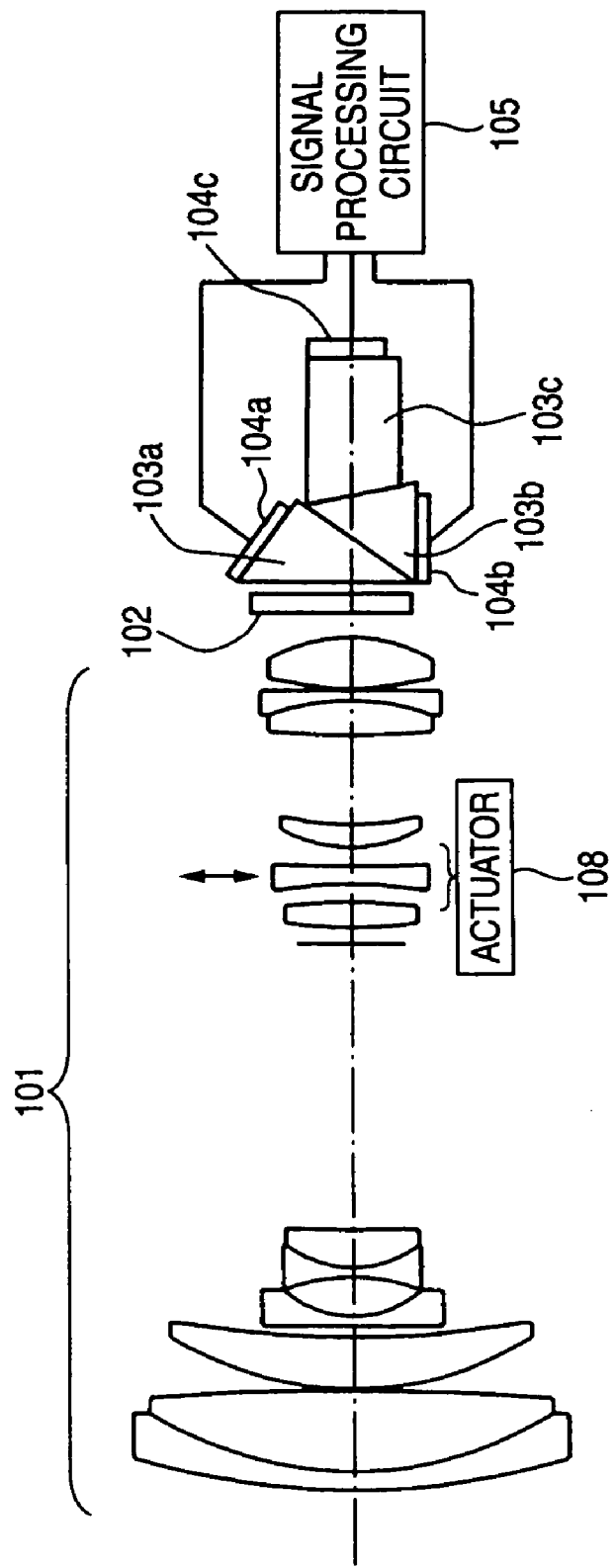
FIG. 16 shows a schematic constitution of an imaging apparatus in which the zoom lens capable of image stabilization according to the embodiment of the present invention is mounted.

FIG. 16 is a schematic constitution diagram of a video camera (or imaging apparatus) in which a zoom lens capable of image stabilization according to the above-described embodiment is mounted. As shown in FIG. 16, a video camera according to this embodiment includes a zoom lens 101, a filter section 102 of a low pass filter or the like, color separation prisms 103a, 103b, and 103c, three CCD imaging elements 104a, 104b, and 104c corresponding to color light components, a signal processing circuit 105 for performing a computing process or the like for signals from the CCD imaging elements 104a, 104b, and 104c, an actuator 108 for driving the lens, and the like. The load of the image stabilization drive system is reduced and the optical performance is good even when a large blurring occurs (e.g., hand shake), by employing a zoom lens capable of image stabilization according to this embodiment as the zoom lens 101.

Next, a specific constitution of a zoom lens capable of image stabilization according to an embodiment of the present invention will be described.

EXAMPLE 1

The zoom lens capable of image stabilization according to the example 1 has a lens constitution as shown in FIG. 1.

That is, the first lens group $G_1$ includes a first lens $L_1$ of a negative meniscus shape having a convex surface directed to the object side, a biconvex second lens $L_2$, and a third lens $L_3$ of a positive meniscus shape having a convex surface directed to the object side, in this order from the object side. The first lens $L_1$ and the second lens $L_2$ are a cemented lens formed by cementing lens surfaces to each other.

The second lens group $G_2$ includes a fourth lens $L_4$ of an approximately plano-concave, a biconcave fifth lens $L_5$, and a sixth lens $L_6$ of a positive meniscus shape having a convex surface directed to the object side, in this order from the object side. The fifth lens $L_5$ and the sixth lens $L_6$ are a cemented lens formed by cementing lens surfaces to each other.

The third lens group $G_3$ includes a biconvex seventh lens $L_7$ of low power, a biconcave eighth lens $L_8$ of low power, and a ninth lens $L_9$ of a positive meniscus shape of low power having a convex surface directed to the object side, in this order from the object side. The 3a-th lens group is constituted with the seventh lens $L_7$, the 3b-th lens group is constituted with the eighth lens $L_8$, and the 3c-th lens group is constituted with the ninth lens $L_9$.

The fourth lens group $G_4$ includes a biconvex tenth lens $L_{10}$, an eleventh lens $L_{11}$ of a negative meniscus shape having a concave surface directed to the object side, and a biconvex twelfth lens $L_{12}$ in this order from the object side. The tenth lens $L_{10}$ and the eleventh lens $L_{11}$ are a cemented lens formed by cementing lens surfaces to each other.

Numerical values relating to the zoom lens capable of image stabilization according to the example 1 are shown in Table 1.

The first line of Table 1 shows the values of the focal length f (mm), $F_{NO}$, and the angle of view 2ω at a wide angle end, a middle position, and a telephoto end.

The second line of Table 1 shows the values of the radius R (mm) of curvature of each lens surface, the central thickness of each lens and an air distance between lenses (hereinafter, collectively referred to as the on-axis surface distance) D (mm), and the refractive index N and the Abbe number ν at the d-line of each lens.

In the table (like Table 3, Table 5, Table 7 and Table 9), numbers are sequence numbers from the object side.

The third lens of Table 1 shows the values of variable ranges of lens group distances D1, D2, D3, and D4 at the wide angle end (f=3.40 mm), the middle position (f=10.55 mm), and the telephoto end (f=32.66 mm) in the field of the above-described on-axis surface distance D.

Table 2 shows the values of constant numbers K, $A_3$, $A_4$, $A_5$, $A_6$, $A_7$, $A_8$, $A_9$, and $A_{10}$ of the aspherical surface shown in the above-described aspherical surface equation. That is, Table 2 shows the values of aspherical surface coefficients in the object side surface of the eighth lens $L_8$, the image plane surface of the ninth lens $L_9$ and both surfaces of the twelfth lens $L_{12}$.

TABLE 1 f = 3.40-10.55-32.66, $F_{NO}$ = 1.85-2.06-2.03
2ω = 59.10°-19.16°-6.24°

| Surface | R | D | $N_d$ | $v_d$ |
|---|---|---|---|---|
| 1 | 46.270 | 1.15 | 1.84660 | 23.9 |
| 2 | 22.920 | 5.00 | 1.62041 | 60.3 |
| 3 | −149.738 | 0.10 | | |
| 4 | 20.557 | 3.22 | 1.72915 | 54.7 |
| 5 | 61.008 | D1 | | |
| 6 | 16941.461 | 0.60 | 1.88299 | 40.7 |
| 7 | 6.113 | 2.43 | | |
| 8 | −11.320 | 0.59 | 1.69679 | 55.5 |
| 9 | 6.490 | 2.36 | 1.84660 | 23.9 |
| 10 | 147.038 | D2 | | |
| 11 | Aperture diaphragm | 1.00 | | |
| 12 | 28.646 | 1.59 | 1.60342 | 38.0 |
| 13 | −34.796 | 1.13 | | |
| *14 | −23.943 | 1.10 | 1.85280 | 39.0 |
| 15 | 111.865 | 1.20 | | |
| 16 | 8.698 | 1.38 | 1.51007 | 56.2 |
| *17 | 17.691 | D3 | | |
| 18 | 55.014 | 2.15 | 1.52249 | 59.8 |
| 19 | −14.233 | 0.63 | 1.84660 | 23.9 |
| 20 | −402.582 | 0.10 | | |
| *21 | 14.201 | 3.20 | 1.51760 | 63.5 |
| *22 | −9.380 | D4 | | |
| 23 | ∞ | 14.95 | 1.51680 | 64.2 |
| 24 | ∞ | | | |

| | Wide angle end | Middle position | Telephoto end |
|---|---|---|---|
| D1 | 0.70 | 10.21 | 15.96 |
| D2 | 17.75 | 8.24 | 2.49 |
| D3 | 5.57 | 3.20 | 3.46 |
| D4 | 2.60 | 4.97 | 4.71 |

*represents aspherical surface.
Parallel eccentric shift amount of correction lens group at time of correcting blurring at 0.3 degree: 0.29

TABLE 2

| | Surface | | | |
|---|---|---|---|---|
| | 14 | 17 | 21 | 22 |
| K | 0.93652 | 1.47814 | −1.30521 | 1.83771 |
| $A_3$ | −8.55589 × 10⁻⁶ | 0.00000 | 4.53216 × 10⁻⁴ | 4.43516 × 10⁻⁴ |
| $A_4$ | 4.29240 × 10⁻⁵ | 2.26454 × 10⁻⁴ | −4.92891 × 10⁻⁴ | 6.81436 × 10⁻⁵ |
| $A_5$ | −1.92769 × 10⁻⁵ | 0.00000 | 4.15960 × 10⁻⁵ | 3.85171 × 10⁻⁵ |
| $A_6$ | 2.89779 × 10⁻⁶ | 3.42797 × 10⁻⁶ | 2.22713 × 10⁻⁶ | 7.98838 × 10⁻⁷ |
| $A_7$ | 1.36383 × 10⁻⁷ | 0.00000 | −5.13109 × 10⁻⁷ | −8.84321 × 10⁻⁸ |
| $A_8$ | −1.84790 × 10⁻⁸ | 6.95453 × 10⁻¹⁰ | −1.01428 × 10⁻⁷ | −2.27632 × 10⁻⁸ |
| $A_9$ | −3.47231 × 10⁻⁹ | 0.00000 | −7.91303 × 10⁻⁹ | −4.48147 × 10⁻⁹ |
| $A_{10}$ | −3.35618 × 10⁻¹⁰ | −3.21644 × 10⁻¹⁰ | −2.83674 × 10⁻¹⁰ | −7.29870 × 10⁻¹⁰ |

Figure 2:
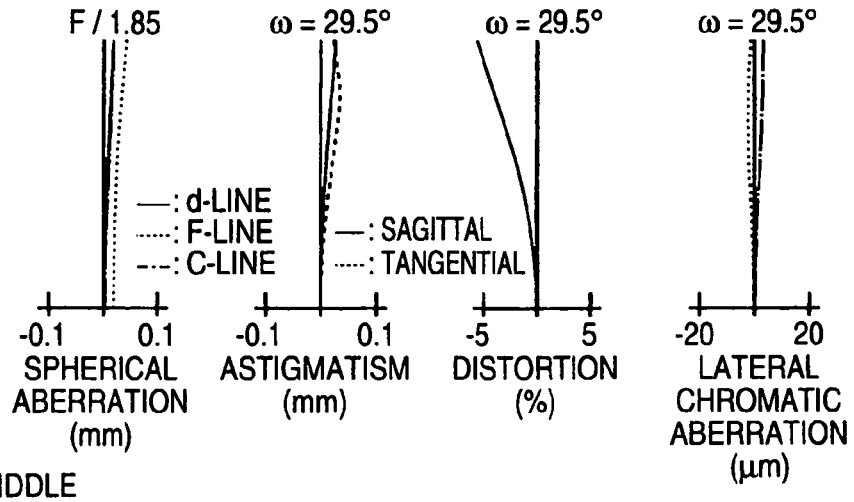
FIG. 2 is aberration diagrams showing various aberrations (spherical aberration, astigmatism, distortion, and a lateral chromatic aberration) at the wide angle end, the middle position, and the telephoto end in the zoom lens capable of image stabilization according to the example 1.
Figure 2:
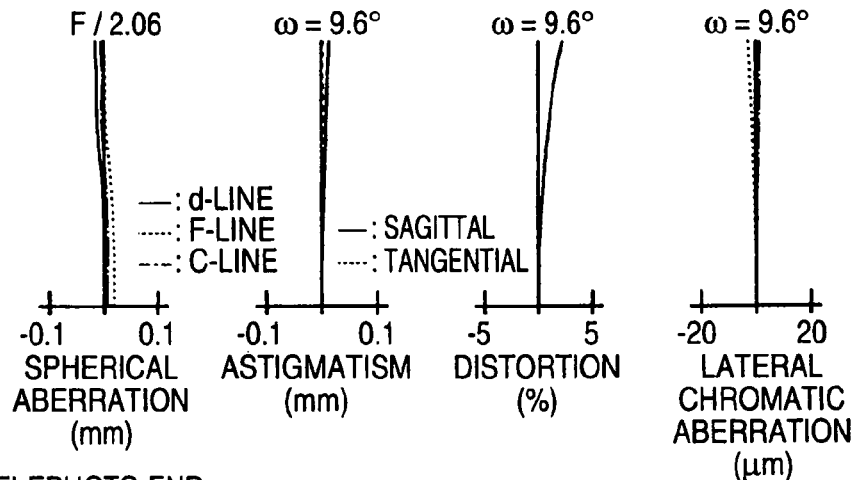
Figure 2:
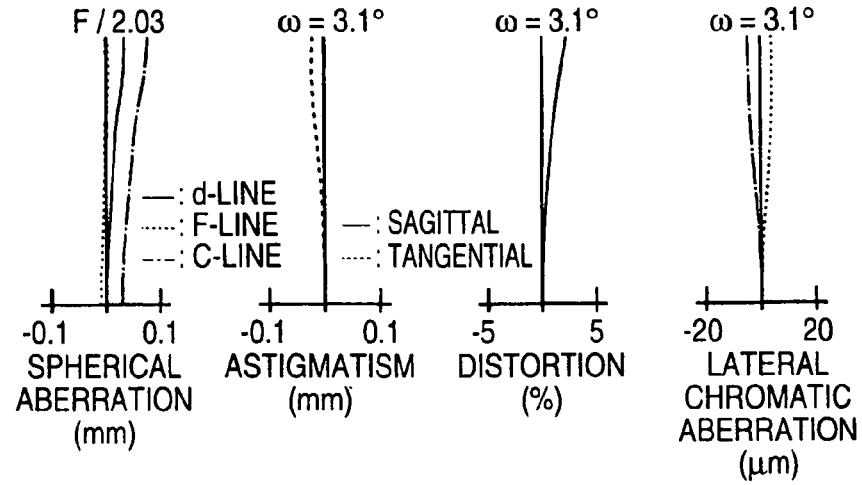

FIG. 2 is aberration diagrams showing various aberrations (spherical aberration, astigmatism, distortion, and lateral chromatic aberration) at the wide angle end (f=3.40 mm), the middle position (f=10.55 mm), and the telephoto end (f=32.66 mm) in the zoom lens capable of image stabilization according to the example 1. In the spherical aberration diagrams, the aberrations at the d-line, the F-line, and the C-line are shown. The aberrations for a sagittal image plane and a tangential image plane are shown in the astigmatism diagrams (like FIG. 5, FIG. 8, FIG. 11, and FIG. 14).

Figure 3:
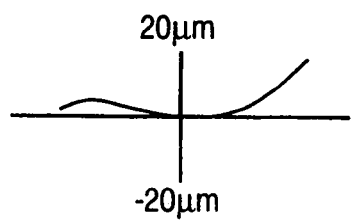
FIG. 3 is aberration diagrams showing lateral aberrations (at the image heights Y of 1.27, 0, and −1.27) at the time of normal and at the time of correcting the blurring at 0.3 degree at the telephoto end of the zoom lens capable of image stabilization according to the example 1.
Figure 3:
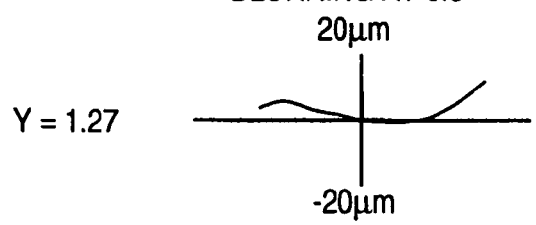
Figure 3:
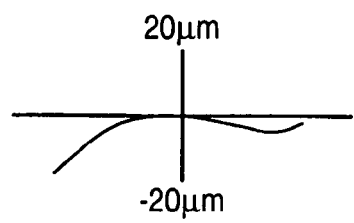
Figure 3:
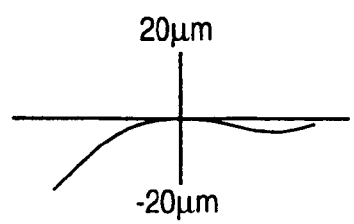

FIG. 3 is aberration diagrams showing lateral aberrations (at the image heights Y of 1.27, 0, and −1.27) at the time of normal (in the case where vibration is absent, which is the same hereinafter) and at the time of correcting blurring at 0.3 degree (in the case where the optical axis is inclined at 0.3 degrees with respect to the basis and is corrected, which is the same hereinafter) at the telephoto end of the zoom lens capable of image stabilization according to the example 1.

As is apparent from FIGS. 2 and 3, a good aberration correction is made across the entire zoom area according to the zoom lens capable of image stabilization according to the example 1.

According to this embodiment, the parallel eccentric shift amount of the correction lens group at the time of correcting blurring at 0.3-degree at the telephoto end was 0.29 mm.

All the above-described conditional expressions (1) to (4) and (7) are satisfied as shown in Table 11.

EXAMPLE 2

Figure 4:
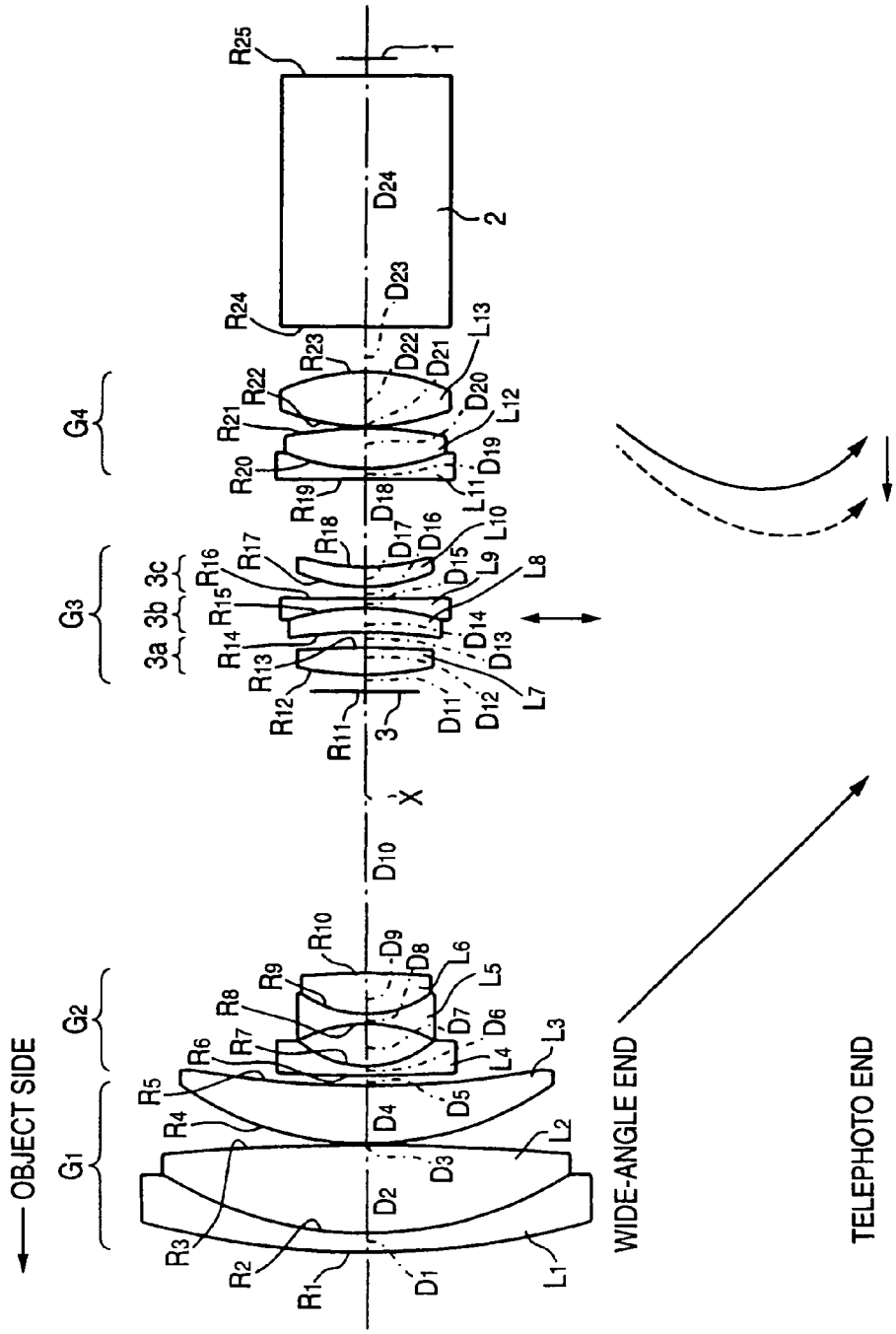
FIG. 4 is a lens constitution diagram of a zoom lens capable of image stabilization according to an example 2 of the present invention.

As shown in FIG. 4, the zoom lens capable of image stabilization according to the example 2 has a lens constitution similar to that of the example 1. The example 2 is primarily different from the example 1 in that the 3b-th lens group is constituted with a cemented lens formed by cementing the eighth lens $L_8$ of a positive meniscus shape having a concave surface directed to the object side and the biconcave lens $L_9$. Moreover, the example 2 is different from the example 1 in that the sixth lens $L_6$ is constituted with a biconvex lens and the fourth lens group $G_4$ is constituted with the biconcave eleventh lens $L_{11}$, the biconvex twelfth lens $L_{12}$, and the biconvex thirteenth lens $L_{13}$ in this order from the object side.

The reduction of the on-axis color aberration can be promoted and the improvement of image quality can be promoted by constituting the 3b-th lens group with the cemented lens including the positive lens and the negative lens.

Numerical values relating to the zoom lens capable of image stabilization according to the example 2 are shown in the following Table 3.

The first line of Table 3 shows the values of the focal length f (mm), $F_{NO}$, and the angle of view 2ω at a wide angle end, a middle position, and a telephoto end.

The second line of Table 3 shows the values of the radius R (mm) of curvature of each lens surface, the on-axis surface distance D (mm) of each lens, and the refractive index N and the Abbe number ν at the d-line of each lens.

The third line of Table 3 shows the values of variable ranges of lens group distances D1, D2, D3, and D4 at the wide angle end (f=3.41 mm), the middle position (f=10.56 mm), and the telephoto end (f=32.69 mm) in the field of the above-described on-axis surface distance D.

Table 4 shows the values of constant numbers K, $A_3$, $A_4$, $A_5$, $A_6$, $A_7$, $A_8$, $A_9$, and $A_{10}$ of the aspherical surface shown in the above-described aspherical surface equation. That is, Table 4 shows the values of aspherical surface coefficients in the object side surface of the eighth lens $L_8$, the object side surface of the tenth lens $L_9$, and both surfaces of the thirteenth lens $L_{13}$.

TABLE 3 f = 3.41-10.56-32.69, $F_{NO}$ = 1.85-2.06-1.99
2ω = 59.48°-19.30°-6.25°

| Surface | R | D | $N_d$ | $v_d$ |
|---|---|---|---|---|
| 1 | 49.461 | 1.15 | 1.84660 | 23.9 |
| 2 | 22.487 | 5.23 | 1.62299 | 58.1 |
| 3 | −129.545 | 0.10 | | |
| 4 | 19.095 | 3.44 | 1.72915 | 54.7 |
| 5 | 56.182 | D1 | | |
| 6 | 74.635 | 0.60 | 1.88299 | 40.7 |
| 7 | 6.051 | 2.54 | | |
| 8 | −8.451 | 0.59 | 1.77250 | 49.6 |
| 9 | 6.502 | 2.45 | 1.84660 | 23.9 |
| 10 | −50.441 | D2 | | |
| 11 | Aperture diaphragm | 1.00 | | |
| 12 | 17.702 | 1.61 | 1.62004 | 36.3 |
| 13 | −75.724 | 0.97 | | |
| *14 | −26.992 | 1.45 | 1.68258 | 31.3 |
| 15 | −14.578 | 0.58 | 1.83480 | 42.7 |
| 16 | 459.108 | 0.70 | | |
| *17 | 8.697 | 1.19 | 1.51007 | 56.2 |
| 18 | 12.561 | D3 | | |
| 19 | −436.227 | 0.65 | 1.84660 | 23.9 |
| 20 | 12.492 | 2.42 | 1.48749 | 70.4 |
| 21 | −23.937 | 0.10 | | |
| *22 | 11.731 | 3.28 | 1.51537 | 61.2 |
| *23 | −11.181 | D4 | | |
| 24 | ∞ | 14.95 | 1.51680 | 64.2 |
| 25 | ∞ | | | |

| | Wide angle end | Middle position | Telephoto end |
|---|---|---|---|
| D1 | 0.60 | 9.67 | 15.15 |
| D2 | 16.94 | 7.87 | 2.39 |
| D3 | 5.26 | 2.95 | 3.55 |
| D4 | 2.70 | 5.01 | 4.41 |

*represents aspherical surface.
Parallel eccentric shift amount of correction lens group at time of correcting blurring at 0.3 degree: 0.35

TABLE 4

| | Surface | | | |
|---|---|---|---|---|
| | 14 | 17 | 22 | 23 |
| K | 0.91441 | 0.58389 | −0.14922 | 1.90133 |
| $A_3$ | $-1.80886 \times 10^{-4}$ | 0.00000 | $3.95047 \times 10^{-4}$ | $2.97045 \times 10^{-4}$ |
| $A_4$ | $1.75930 \times 10^{-4}$ | $-1.54382 \times 10^{-4}$ | $-3.52626 \times 10^{-4}$ | $3.32542 \times 10^{-5}$ |
| $A_5$ | $-3.69722 \times 10^{-5}$ | 0.00000 | $3.17430 \times 10^{-5}$ | $1.68202 \times 10^{-5}$ |
| $A_6$ | $8.94463 \times 10^{-7}$ | $-8.93857 \times 10^{-7}$ | $1.19363 \times 10^{-6}$ | $9.37331 \times 10^{-7}$ |
| $A_7$ | $2.58142 \times 10^{-7}$ | 0.00000 | $-3.48725 \times 10^{-7}$ | $1.60475 \times 10^{-8}$ |
| $A_8$ | $2.23283 \times 10^{-8}$ | $-1.90435 \times 10^{-10}$ | $-5.41341 \times 10^{-8}$ | $-1.42537 \times 10^{-8}$ |
| $A_9$ | $1.04457 \times 10^{-9}$ | 0.00000 | $-2.22051 \times 10^{-9}$ | $-4.12792 \times 10^{-9}$ |
| $A_{10}$ | $3.97509 \times 10^{-11}$ | $-2.03563 \times 10^{-10}$ | $2.47802 \times 10^{-10}$ | $-7.05320 \times 10^{-10}$ |

Figure 5:
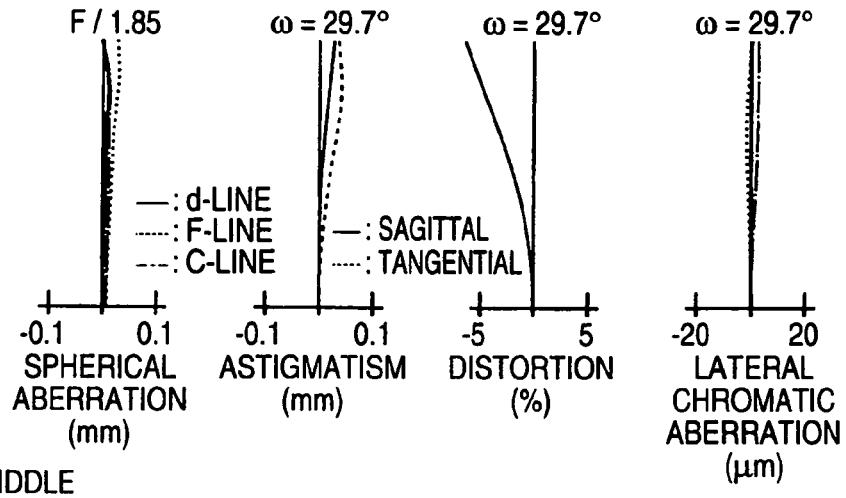
FIG. 5 is aberration diagrams showing various aberrations (spherical aberration, astigmatism, distortion, and a lateral chromatic aberration) at the wide angle end, the middle position, and the telephoto end in the zoom lens capable of image stabilization according to the example 2.
Figure 5:
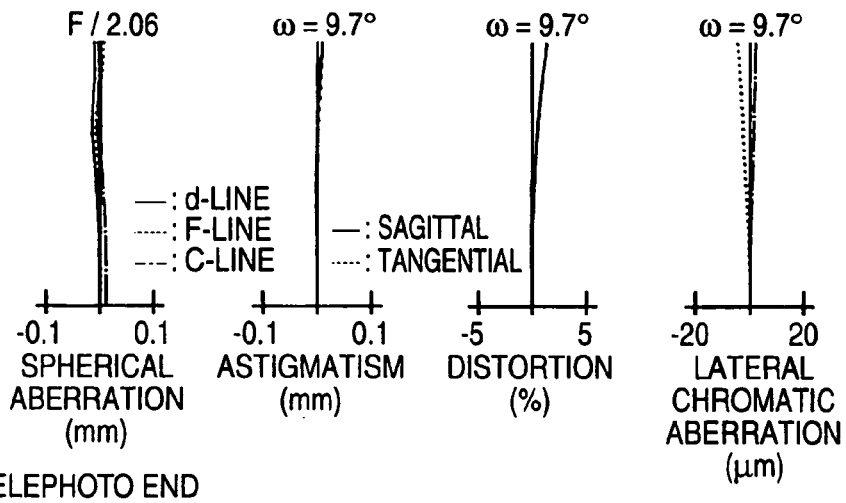
Figure 5:
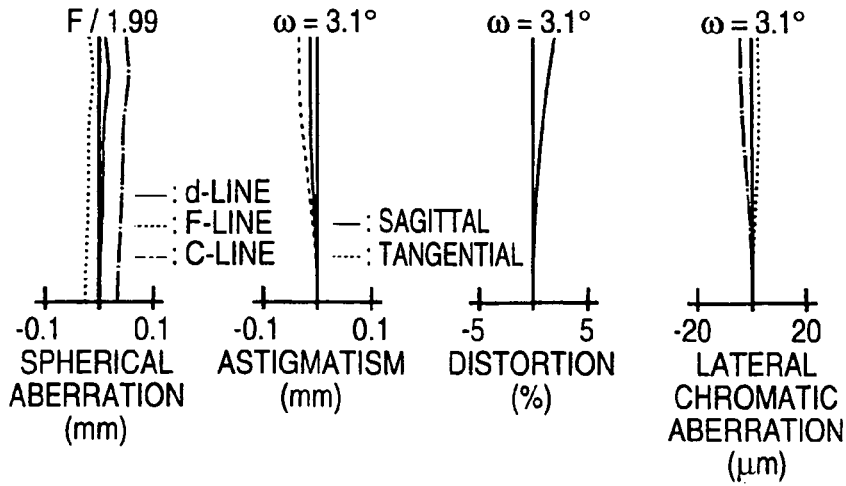

FIG. 5 is aberration diagrams showing various aberrations (spherical aberration, astigmatism, distortion, and lateral chromatic aberration) at the wide angle end (f=3.41 mm), the middle position (f=10.56 mm), and the telephoto end (f=32.69 mm) in the zoom lens capable of image stabilization according to the example 2.

Figure 6:
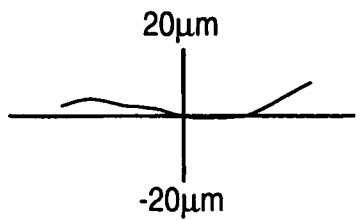
FIG. 6 is aberration diagrams showing lateral aberrations (at the image heights Y of 1.27, 0, and −1.27) at the time of normal and at the time of correcting the blurring at 0.3 degree at the telephoto end of the zoom lens capable of image stabilization according to the example 2.
Figure 6:
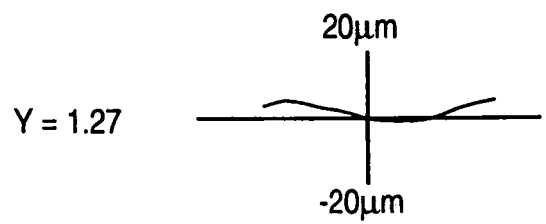
Figure 6:
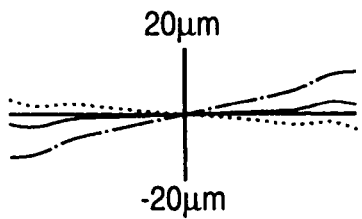
Figure 6:
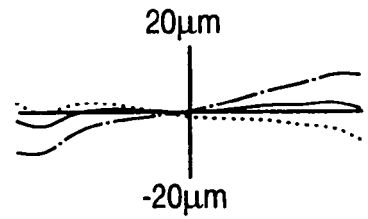
Figure 6:
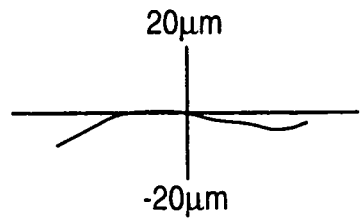
Figure 6:
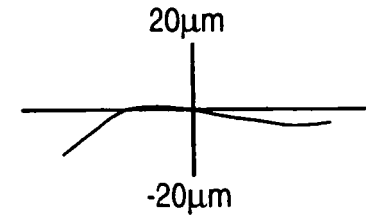

FIG. 6 is aberration diagrams showing lateral aberrations (at the image heights Y of 1.27, 0, and −1.27) at the time of normal and at the time of correcting blurring at 0.3 degree at the telephoto end of the zoom lens having the image stabilization function according to the example 2.

As is apparent from FIGS. 5 and 6, a good aberration correction is made across the entire zoom area according to the zoom lens capable of image stabilization according to the example 2.

According to this embodiment, the parallel eccentric shift amount of the correction lens group at the time of correcting blurring at 0.3 degree at the telephoto end was 0.35 mm.

All the above-described conditional expressions (1), (2), and (5) to (7) are satisfied as shown in Table 11.

EXAMPLE 3

Figure 7:
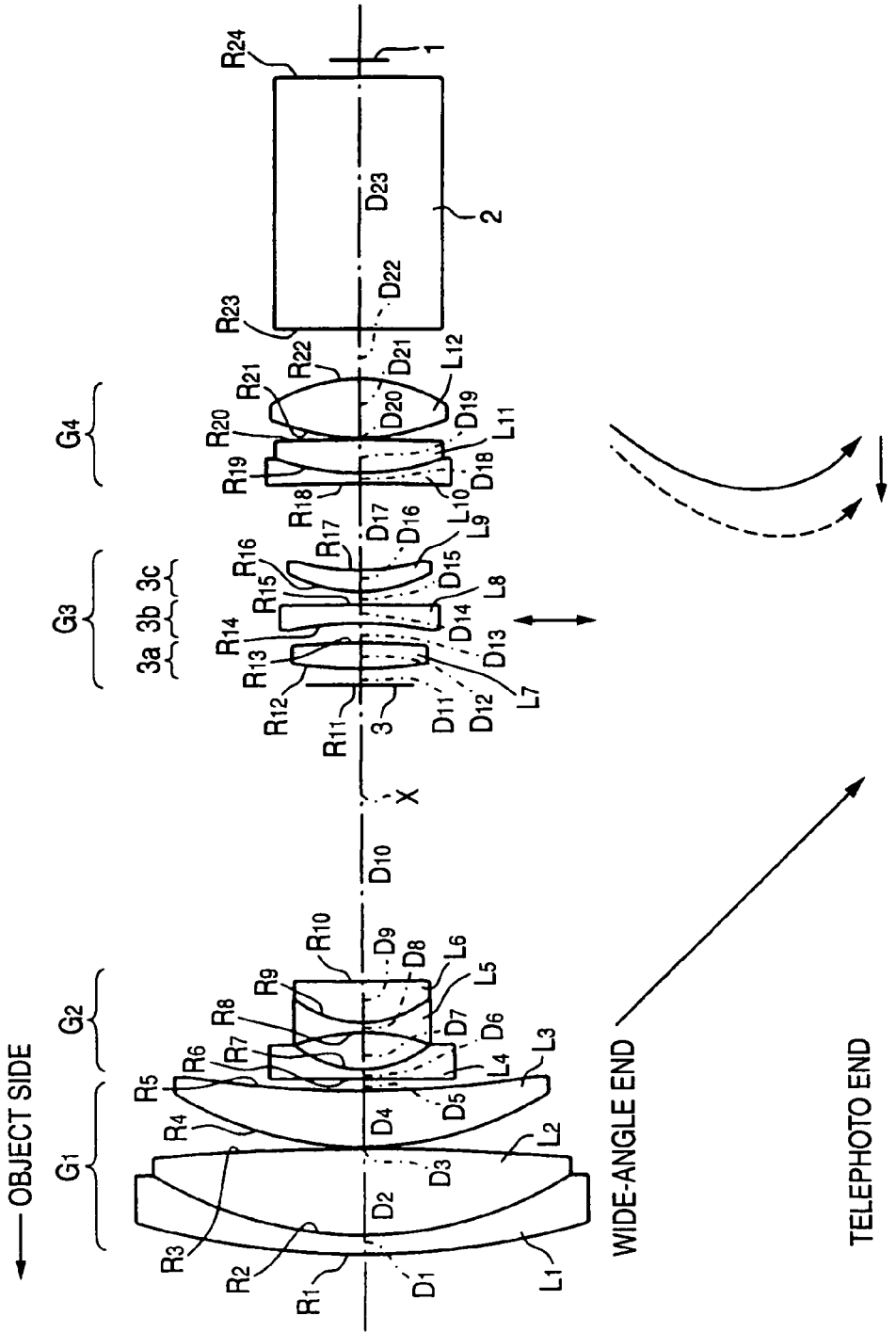
FIG. 7 is a lens constitution diagram of a zoom lens capable of image stabilization according to an example 3 of the present invention.

As shown in FIG. 7, the zoom lens capable of image stabilization according to the example 3 has a lens constitution similar to that of the example 1. The example 3 is primarily different from the example 1 in that the fourth lens $L_4$ is constituted with a plano-concave lens, the eighth lens $L_8$ is constituted with a negative meniscus lens having a concave surface directed to the object side, the tenth lens $L_{10}$ is constituted with a biconcave lens, and the eleventh lens $L_{11}$ is constituted with a biconvex lens.

Numerical values relating to the zoom lens having the image stabilization function according to the example 3 are shown in the following Table 5.

The first line of Table 5 shows the values of the focal length f (mm), $F_{NO}$, and the angle of view 2ω at a wide angle end, a middle position, and a telephoto end.

The second line of Table 5 shows the values of the radius R (mm) of curvature of each lens surface, the on-axis surface distance D (mm) of each lens, and the refractive index N and the Abbe number ν at the d-line of each lens.

The third line of Table 5 shows the values of variable ranges of lens group distances D1, D2, D3, and D4 at the wide angle end (f=3.41 mm), the middle position (f=10.56 mm), and the telephoto end (f=32.69 mm) in the field of the above-described on-axis surface distance D.

the object side surface of the eighth lens $L_8$, the object side surface of the ninth lens $L_9$, and both surfaces of the twelfth lens $L_{12}$.

TABLE 5 f = 3.41-10.56-32.69, $F_{NO}$ = 1.85-2.05-1.99
2ω = 59.07°-19.16°-6.23°

| Surface | R | D | $N_d$ | $ν_d$ |
|---|---|---|---|---|
| 1 | 47.102 | 1.15 | 1.84660 | 23.9 |
| 2 | 22.749 | 5.14 | 1.62041 | 60.3 |
| 3 | −146.766 | 0.10 | | |
| 4 | 20.373 | 3.36 | 1.71299 | 53.8 |
| 5 | 62.968 | D1 | | |
| 6 | ∞ | 0.60 | 1.88299 | 40.7 |
| 7 | 6.282 | 2.20 | | |
| 8 | −11.450 | 0.59 | 1.72915 | 54.7 |
| 9 | 6.293 | 2.48 | 1.84660 | 23.9 |
| 10 | 637.375 | D2 | | |
| 11 | Aperture diaphragm | 1.00 | | |
| 12 | 25.735 | 1.55 | 1.62004 | 36.2 |
| 13 | −47.903 | 1.20 | | |
| *14 | −20.897 | 1.10 | 1.80348 | 40.4 |
| 15 | −1222.121 | 0.80 | | |
| *16 | 8.149 | 1.26 | 1.51007 | 56.2 |
| 17 | 12.824 | D3 | | |
| 18 | −150.223 | 0.63 | 1.84660 | 23.9 |
| 19 | 14.503 | 1.99 | 1.48749 | 70.4 |
| 20 | −138.706 | 0.10 | | |
| *21 | 10.473 | 3.54 | 1.51537 | 61.2 |
| *22 | −9.024 | D4 | | |
| 23 | ∞ | 14.95 | 1.51680 | 64.2 |
| 24 | ∞ | | | |

| | Wide angle end | Middle position | Telephoto end |
|---|---|---|---|
| D1 | 0.70 | 10.17 | 15.96 |
| D2 | 17.75 | 8.28 | 2.49 |
| D3 | 5.21 | 2.97 | 3.49 |
| D4 | 3.00 | 5.24 | 4.71 |

*represents aspherical surface.
Parallel eccentric shift amount of correction lens group at time of correcting blurring at 0.3 degree: 0.35

TABLE 6

| | Surface | | | |
|---|---|---|---|---|
| | 14 | 16 | 21 | 22 |
| K | 0.86773 | 0.60368 | −1.06167 | 1.41302 |
| $A_3$ | $-1.56356 \times 10^{-4}$ | 0.00000 | $5.59352 \times 10^{-4}$ | $4.29467 \times 10^{-4}$ |
| $A_4$ | $1.51065 \times 10^{-4}$ | $-1.53947 \times 10^{-4}$ | $-4.09050 \times 10^{-4}$ | $1.31854 \times 10^{-4}$ |
| $A_5$ | $-3.76654 \times 10^{-5}$ | 0.00000 | $3.84915 \times 10^{-5}$ | $2.07753 \times 10^{-5}$ |
| $A_6$ | $1.56106 \times 10^{-6}$ | $4.25136 \times 10^{-7}$ | $1.13700 \times 10^{-6}$ | $7.53172 \times 10^{-7}$ |
| $A_7$ | $2.70651 \times 10^{-7}$ | 0.00000 | $-4.67036 \times 10^{-7}$ | $-3.33037 \times 10^{-8}$ |
| $A_8$ | $1.59144 \times 10^{-8}$ | $-7.08693 \times 10^{-8}$ | $-7.46329 \times 10^{-8}$ | $-2.24279 \times 10^{-8}$ |
| $A_9$ | $7.80958 \times 10^{-11}$ | 0.00000 | $-4.27465 \times 10^{-9}$ | $-5.29518 \times 10^{-9}$ |
| $A_{10}$ | $-5.18904 \times 10^{-11}$ | $-7.58796 \times 10^{-10}$ | $6.60857 \times 10^{-11}$ | $-8.42938 \times 10^{-10}$ |

Table 6 shows the values of constant numbers K, $A_3$, $A_4$, $A_5$, $A_6$, $A_7$, $A_8$, $A_9$, and $A_{10}$ of the aspherical surface shown in the above-described aspherical surface equation. That is, Table 6 shows the values of aspherical surface coefficients in FIG. 8 is aberration diagrams showing various aberrations (spherical aberration, astigmatism, distortion, and lateral chromatic aberration) at the wide angle end (f=3.41 mm), the middle position (f=10.56 mm), and the telephoto end (f=32.69 mm) in the zoom lens capable of image stabilization according to the example 3.

Figure 9:
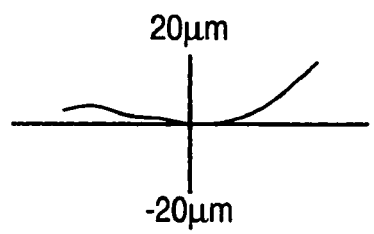
FIG. 9 is aberration diagrams showing lateral aberrations (at the image heights Y of 1.27, 0, and −1.27) at the time of normal and at the time of correcting the blurring at 0.3 degree at the telephoto end of the zoom lens capable of image stabilization according to the example 3.
Figure 9:
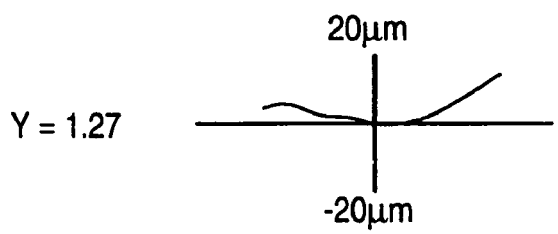
Figure 9:
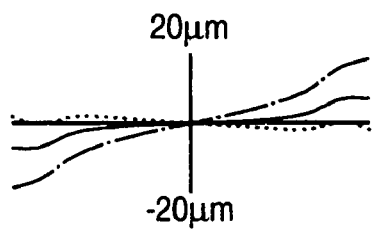
Figure 9:
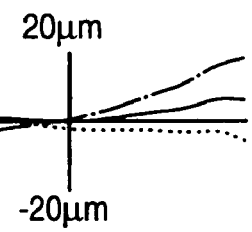
Figure 9:
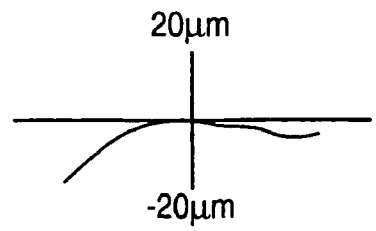
Figure 9:
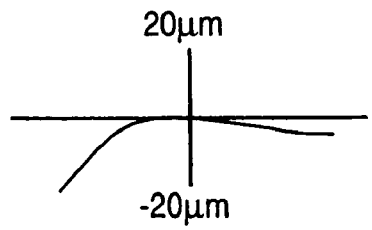

FIG. 9 is aberration diagrams showing lateral aberrations (at the image heights Y of 1.27, 0, and −1.27) at the time of normal and at the time of correcting blurring at 0.3 degree at the telephoto end of the zoom lens having the image stabilization function according to the example 3.

Figure 8:
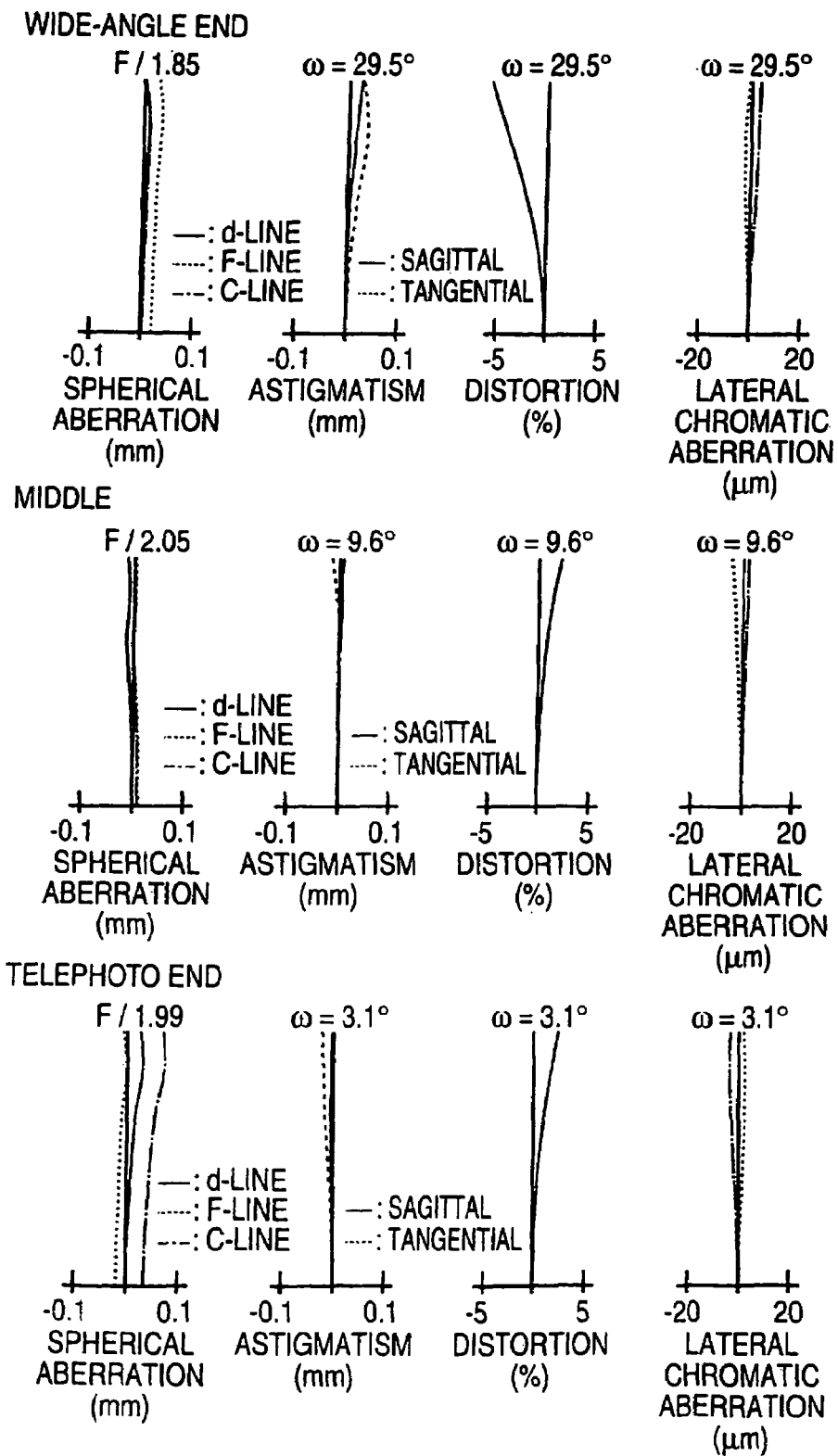
FIG. 8 is aberration diagrams showing various aberrations (spherical aberration, astigmatism, distortion, and a lateral chromatic aberration) at the wide angle end, the middle position, and the telephoto end in the zoom lens capable of image stabilization according to the example 3.

As is apparent from FIGS. 8 and 9, a good aberration correction is made across the entire zoom area according to the zoom lens capable of image stabilization according to the example 3.

According to this embodiment, the parallel eccentric shift amount of the correction lens group at the time of correcting blurring at 0.3 degree at the telephoto end was 0.35 mm.

All the above-described conditional expressions (1) to (4), and (7) are satisfied as shown in Table 11.

EXAMPLE 4

Figure 10:
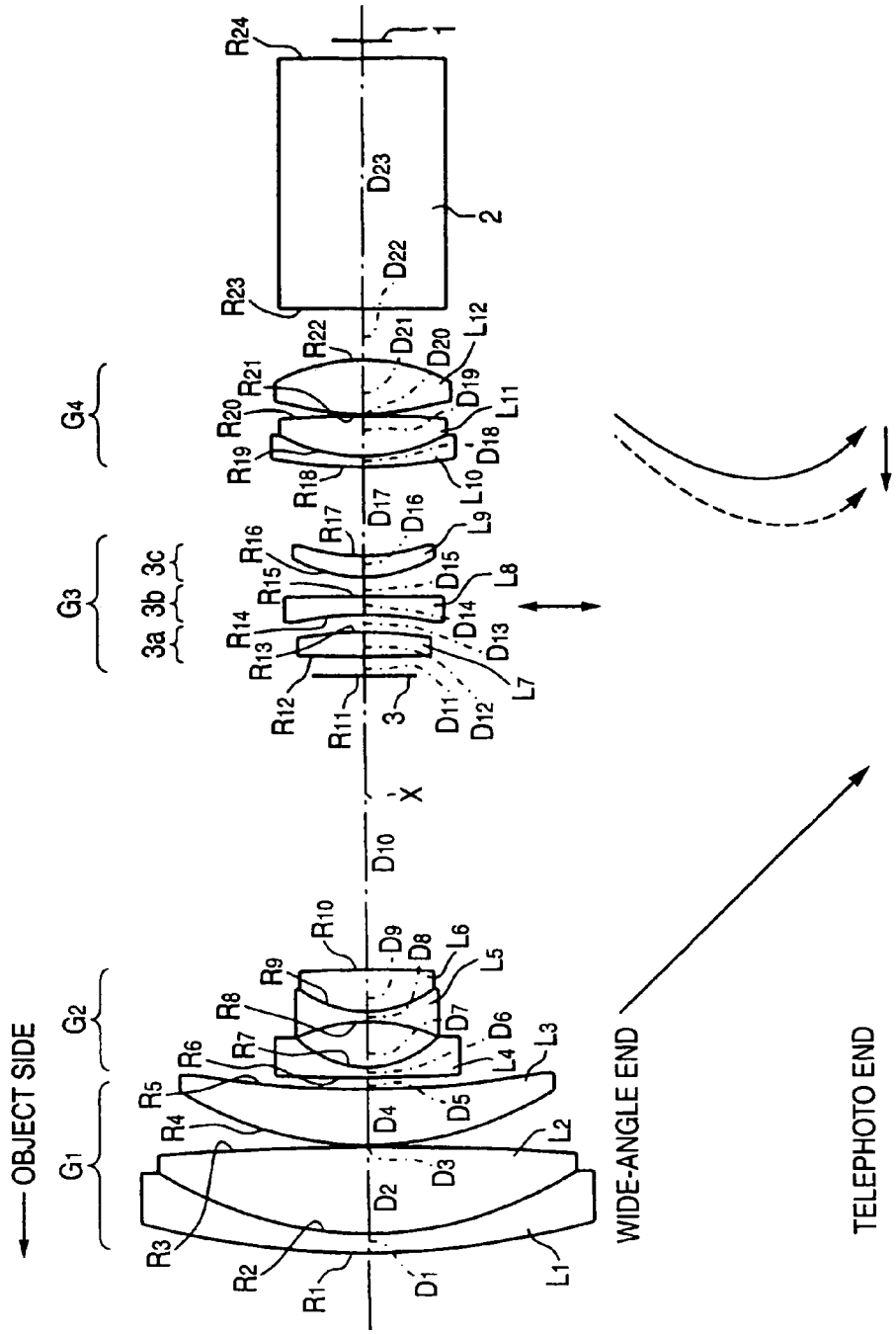
FIG. 10 is a lens constitution diagram of a zoom lens capable of image stabilization according to an example 4 of the present invention.

As shown in FIG. 10, the zoom lens capable of image stabilization according to the example 4 has a lens constitution similar to that of the example 1. The example 4 is primarily different from the example 1 in that the sixth lens $L_6$ is constituted with a biconvex lens, the eighth lens $L_8$ is constituted with a negative meniscus lens having a concave surface directed to the object side, the tenth lens $L_{10}$ is constituted with a negative meniscus lens having a convex surface directed to the object side, and the eleventh lens $L_{11}$ is constituted with a biconvex lens.

Numerical values relating to the zoom lens having the image stabilization function according to the example 4 are shown in the following Table 7.

The first line of Table 7 shows the values of the focal length f (mm), $F_{NO}$, and the angle of view 2ω at a wide angle end, a middle position, and a telephoto end.

The second line of Table 7 shows the values of the radius R (mm) of curvature of each lens surface, the on-axis surface distance D (mm) of each lens, and the refractive index N and the Abbe number ν at the d-line of each lens.

The third line of Table 7 shows the values of variable ranges of lens group distances D1, D2, D3, and D4 at the wide angle end (f=3.41 mm), the middle position (f=10.56 mm), and the telephoto end (f=32.69 mm) in the field of the above-described on-axis surface distance D.

That is, Table 8 shows the values of aspherical surface coefficients in the object side surface of the eighth lens $L_8$, the object side surface of the ninth lens $L_9$, and both surfaces of the twelfth lens $L_{12}$.

TABLE 7 f = 3.41-10.56-32.69, $F_{NO}$ = 1.85-2.04-1.93
2ω = 58.83°-19.23°-6.23°

| Surface | R | D | $N_d$ | $ν_d$ |
|---|---|---|---|---|
| 1 | 51.315 | 1.15 | 1.84660 | 23.9 |
| 2 | 22.793 | 5.13 | 1.62041 | 60.3 |
| 3 | −152.801 | 0.10 | | |
| 4 | 20.424 | 3.36 | 1.77250 | 49.6 |
| 5 | 61.961 | D1 | | |
| 6 | 110.377 | 0.62 | 1.88299 | 40.7 |
| 7 | 5.934 | 2.74 | | |
| 8 | −10.100 | 0.61 | 1.72915 | 54.7 |
| 9 | 6.679 | 2.51 | 1.84660 | 23.9 |
| 10 | −63.803 | D2 | | |
| 11 | Aperture diaphragm | 1.18 | | |
| 12 | 149.998 | 1.49 | 1.58144 | 40.7 |
| 13 | −22.495 | 1.05 | | |
| *14 | −20.030 | 1.10 | 1.80348 | 40.4 |
| 15 | −352.269 | 1.15 | | |
| *16 | 7.864 | 1.28 | 1.51007 | 56.2 |
| 17 | 12.061 | D3 | | |
| 18 | 29.219 | 0.64 | 1.84660 | 23.9 |
| 19 | 10.420 | 2.43 | 1.48749 | 70.4 |
| 20 | −67.150 | 0.10 | | |
| *21 | 14.339 | 3.24 | 1.51537 | 61.2 |
| *22 | −11.170 | D4 | | |
| 23 | ∞ | 14.95 | 1.51680 | 64.2 |
| 24 | ∞ | | | |

| | Wide angle end | Middle position | Telephoto end |
|---|---|---|---|
| D1 | 0.70 | 10.22 | 16.05 |
| D2 | 17.57 | 8.05 | 2.22 |
| D3 | 5.35 | 3.35 | 4.43 |
| D4 | 3.05 | 5.04 | 3.97 |

*represents aspherical surface.
Parallel eccentric shift amount of correction lens group at time of correcting blurring at 0.3 degree: 0.35

TABLE 8

| | Surface | | | |
|---|---|---|---|---|
| | 14 | 16 | 21 | 22 |
| K | −2.63468 | 0.14006 | −5.22345 | 1.16193 |
| $A_3$ | −1.29991 × 10$^{-4}$ | 0.00000 | 5.70608 × 10$^{-5}$ | 4.71528 × 10$^{-5}$ |
| $A_4$ | 6.49179 × 10$^{-5}$ | −2.04379 × 10$^{-5}$ | −1.40452 × 10$^{-5}$ | 1.66753 × 10$^{-5}$ |
| $A_5$ | −3.67470 × 10$^{-5}$ | 0.00000 | −3.23014 × 10$^{-6}$ | 2.10730 × 10$^{-6}$ |
| $A_6$ | 3.27856 × 10$^{-7}$ | −1.33423 × 10$^{-6}$ | −5.06969 × 10$^{-7}$ | 3.41779 × 10$^{-8}$ |
| $A_7$ | 1.83619 × 10$^{-6}$ | 0.00000 | −8.89029 × 10$^{-8}$ | −4.04180 × 10$^{-8}$ |
| $A_8$ | 2.28542 × 10$^{-8}$ | −4.35212 × 10$^{-8}$ | −1.75413 × 10$^{-8}$ | −1.15887 × 10$^{-8}$ |
| $A_9$ | −1.33223 × 10$^{-7}$ | 0.00000 | −3.30966 × 10$^{-9}$ | −2.34293 × 10$^{-9}$ |
| $A_{10}$ | 1.68989 × 10$^{-8}$ | 2.05770 × 10$^{-9}$ | −5.16958 × 10$^{-10}$ | −4.18153 × 10$^{-10}$ |
| $A_{11}$ | 0.00000 | 0.00000 | −4.78013 × 10$^{-11}$ | −7.05599 × 10$^{-11}$ |
| $A_{12}$ | 0.00000 | 0.00000 | 6.75010 × 10$^{-12}$ | −1.14688 × 10$^{-11}$ |

Table 8 shows the values of constant numbers K, $A_3$, $A_4$, $A_5$, $A_6$, $A_7$, $A_8$, $A_9$, $A_{10}$, $A_{11}$, and $A_{12}$ of the aspherical surface shown in the above-described aspherical surface equation.

Figure 11:
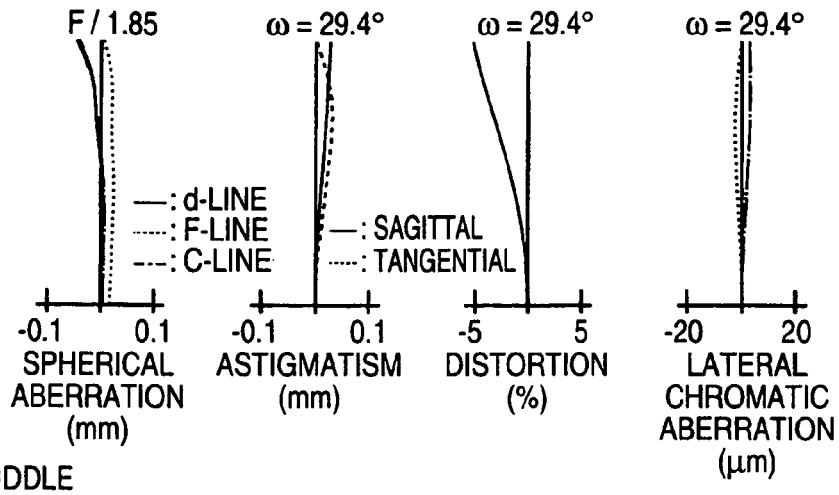
FIG. 11 is aberration diagrams showing various aberrations (spherical aberration, astigmatism, distortion, and a lateral chromatic aberration) at the wide angle end, the middle position, and the telephoto end in the zoom lens capable of image stabilization according to the example 4.
Figure 11:
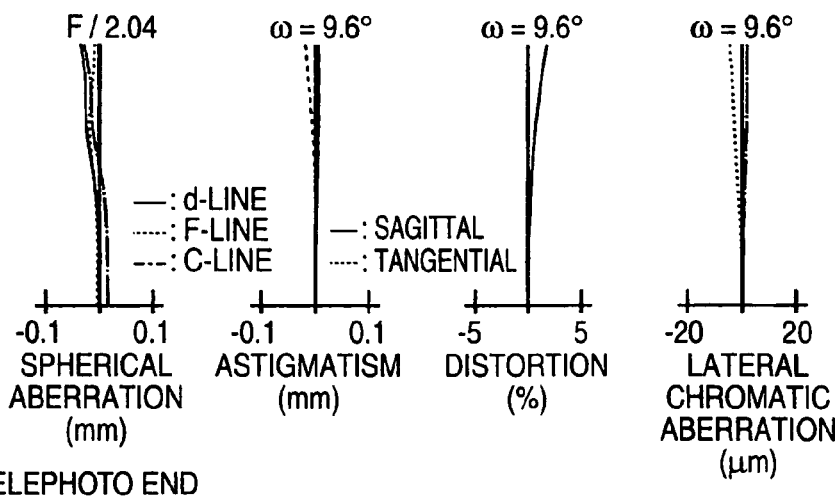
Figure 11:
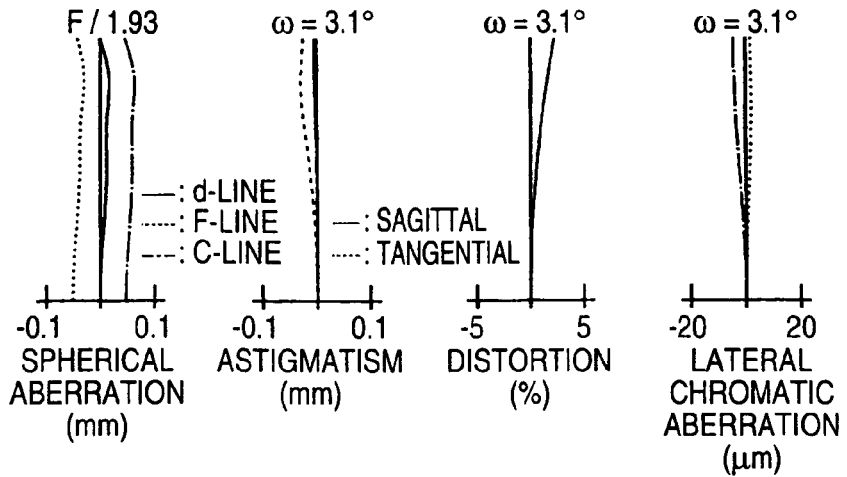

FIG. 11 is aberration diagrams showing various aberrations (spherical, astigmatism aberration, distortion, and lateral chromatic aberration) at the wide angle end (f=3.41 mm), the middle position (f=10.56 mm), and the telephoto end (f=32.69 mm) in the zoom lens capable of image stabilization according to the example 4.

Figure 12:
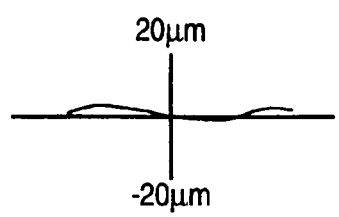
FIG. 12 is aberration diagrams showing lateral aberrations (at the image heights Y of 1.27, 0, and −1.27) at the time of normal and at the time of correcting the blurring at 0.3 degree at the telephoto end of the zoom lens capable of image stabilization according to the example 4.
Figure 12:
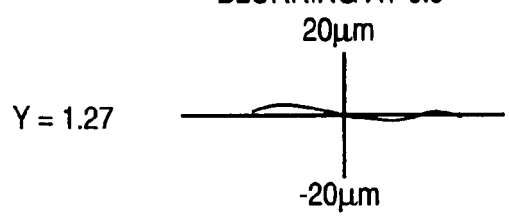
Figure 12:
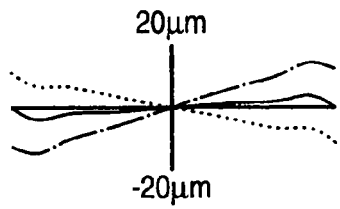
Figure 12:
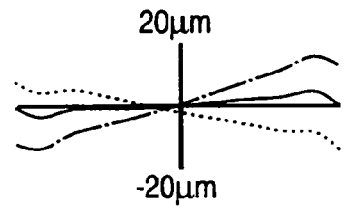
Figure 12:
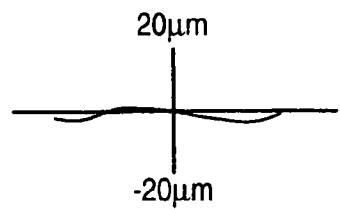
Figure 12:
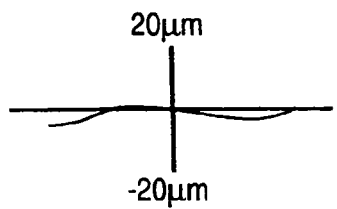

FIG. 12 is aberration diagrams showing lateral aberrations (at the image heights Y of 1.27, 0, and −1.27) at the time of normal and at the time of correcting blurring at 0.3-degree at the telephoto end of the zoom lens having the image stabilization function according to the example 4.

As is apparent from FIGS. 11 and 12, a good aberration correction is made across the entire zoom area according to the zoom lens capable of image stabilization according to the example 4.

According to this embodiment, the parallel eccentric shift amount of the correction lens group at the time of correcting blurring at 0.3-degree at the telephoto end was 0.35 mm.

All the above-described conditional expressions (1) to (4), and (7) are satisfied as shown in Table 11.

EXAMPLE 5

Figure 13:
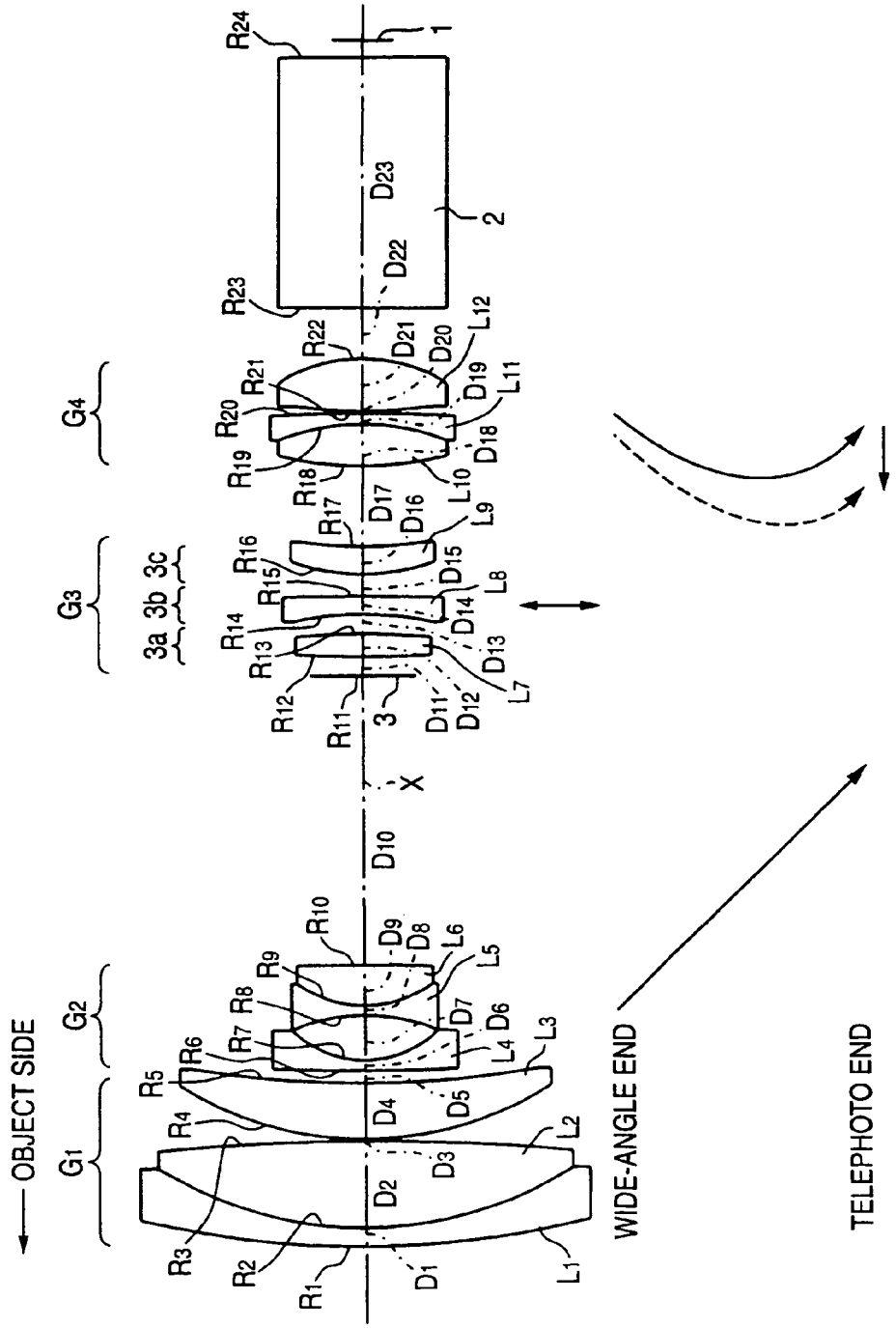
FIG. 13 is a lens constitution diagram of a zoom lens capable of image stabilization according to an example 5 of the present invention.

As shown in FIG. 13, the zoom lens capable of image stabilization according to the example 5 has a lens constitution similar to that of the example 1. The example 5 is primarily different from the example 1 in that the sixth lens $L_6$ is constituted with a biconvex lens and the eighth lens $L_8$ is constituted with a negative meniscus lens having a concave surface directed to the object side.

Numerical values relating to the zoom lens having the image stabilization function according to the example 5 are shown in the following Table 9.

The first line of Table 9 shows the values of the focal length f (mm), $F_{NO}$, and the angle of view 2ω at a wide angle end, a middle position, and a telephoto end.

The second line of Table 9 shows the values of the radius R (mm) of curvature of each lens surface, the on-axis surface distance D (mm) of each lens, and the refractive index N and the Abbe number ν at the d-line of each lens.

The third line of Table 9 shows the values of variable ranges of lens group distances D1, D2, D3, and D4 at the wide angle end (f=3.40 mm), the middle position (f=10.55 mm), and the telephoto end (f=32.68 mm) in the field of the above-described on-axis surface distance D.

Table 10 shows the values of constant numbers K, $A_3$, $A_4$, $A_5$, $A_6$, $A_7$, $A_8$, $A_9$, $A_{10}$ $A_{11}$, and $A_{12}$ of the aspherical surface shown in the above-described aspherical surface equation.

That is, Table 10 shows the values of aspherical surface coefficients in the object side surface of the eighth lens $L_8$, the object side surface of the ninth lens $L_9$, and both surfaces of the twelfth lens $L_{12}$.

TABLE 9 f = 3.40-10.55-32.68, $F_{NO}$ = 1.85-2.06-1.93
2ω = 58.82°-19.20°-6.23°

| Surface | R | D | $N_d$ | $v_d$ |
|---|---|---|---|---|
| 1 | 54.676 | 1.15 | 1.84660 | 23.9 |
| 2 | 22.785 | 5.20 | 1.62041 | 60.3 |
| 3 | −126.687 | 0.10 | | |
| 4 | 20.215 | 3.39 | 1.77250 | 49.6 |
| 5 | 62.146 | D1 | | |
| 6 | 150.196 | 0.62 | 1.88299 | 40.7 |
| 7 | 6.084 | 2.69 | | |
| 8 | −10.759 | 0.61 | 1.71299 | 53.8 |
| 9 | 6.925 | 2.42 | 1.84660 | 23.9 |
| 10 | −161.925 | D2 | | |
| 11 | Aperture diaphragm | 1.18 | | |
| 12 | 89.164 | 1.39 | 1.80517 | 25.4 |
| 13 | −40.898 | 1.18 | | |
| *14 | −19.241 | 1.10 | 1.80348 | 40.4 |
| 15 | −206.845 | 1.33 | | |
| *16 | 11.588 | 1.65 | 1.51007 | 56.2 |
| 17 | 24.137 | D3 | | |
| 18 | 20.754 | 2.53 | 1.48749 | 70.4 |
| 19 | −13.156 | 0.64 | 1.84660 | 23.9 |
| 20 | −114.106 | 0.10 | | |
| *21 | 19.110 | 3.19 | 1.51564 | 62.7 |
| *22 | −9.217 | D4 | | |
| 23 | ∞ | 14.95 | 1.51680 | 64.2 |
| 24 | ∞ | | | |

| | Wide angle end | Middle position | Telephoto end |
|---|---|---|---|
| D1 | 0.75 | 10.11 | 15.91 |
| D2 | 17.41 | 8.05 | 2.25 |
| D3 | 4.87 | 2.85 | 3.96 |
| D4 | 3.05 | 5.07 | 3.96 |

*represents aspherical surface.
Parallel eccentric shift amount of correction lens group at time of correcting blurring at 0.3 degree: 0.36

TABLE 10

| | Surface | | | |
|---|---|---|---|---|
| | 14 | 16 | 21 | 22 |
| K | −4.69787 | 0.02458 | −12.31234 | 0.70132 |
| $A_3$ | −2.02379 × $10^{-4}$ | 0.00000 | 1.05377 × $10^{-4}$ | 9.61152 × $10^{-5}$ |
| $A_4$ | 8.97051 × $10^{-5}$ | −4.26309 × $10^{-5}$ | −1.52853 × $10^{-4}$ | −9.74627 × $10^{-6}$ |
| $A_5$ | −5.10968 × $10^{-5}$ | 0.00000 | −1.95178 × $10^{-5}$ | 4.79240 × $10^{-6}$ |
| $A_6$ | −2.96881 × $10^{-6}$ | 1.77999 × $10^{-6}$ | −5.05535 × $10^{-9}$ | −6.43473 × $10^{-7}$ |
| $A_7$ | 2.87500 × $10^{-6}$ | 0.00000 | 1.74791 × $10^{-7}$ | −3.32578 × $10^{-7}$ |
| $A_8$ | 1.87947 × $10^{-7}$ | −2.52921 × $10^{-7}$ | −2.69979 × $10^{-8}$ | −5.91915 × $10^{-8}$ |
| $A_9$ | −1.79586 × $10^{-7}$ | 0.00000 | −2.13306 × $10^{-8}$ | −6.17879 × $10^{-9}$ |
| $A_{10}$ | 1.82815 × $10^{-8}$ | 6.30167 × $10^{-9}$ | −5.63042 × $10^{-9}$ | −5.17864 × $10^{-10}$ |
| $A_{11}$ | 0.00000 | 0.00000 | −7.41125 × $10^{-10}$ | −1.80691 × $10^{-10}$ |
| $A_{12}$ | 0.00000 | 0.00000 | 8.05550 × $10^{-11}$ | −1.03807 × $10^{-10}$ |

Figure 14:
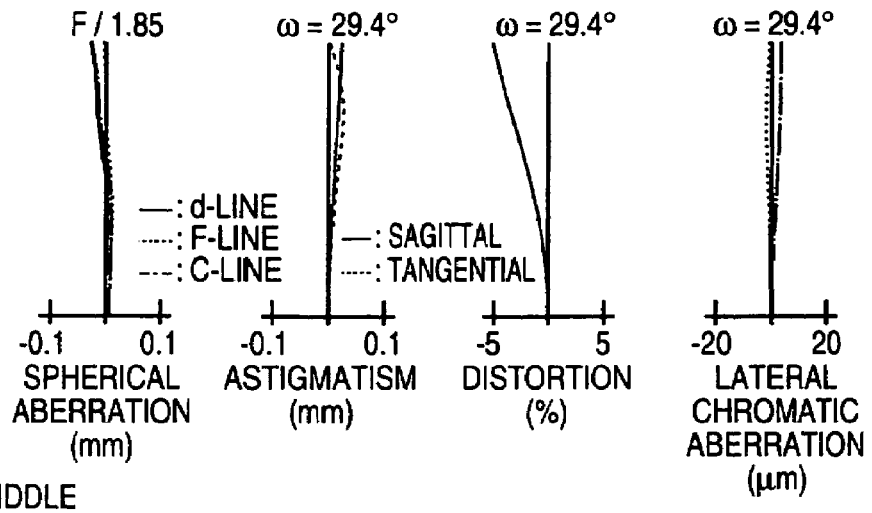
FIG. 14 is aberration diagrams showing various aberrations (spherical aberration, astigmatism, distortion, and a lateral chromatic aberration) at the wide angle end, the middle position, and the telephoto end in the zoom lens capable of image stabilization according to the example 5.
Figure 14:
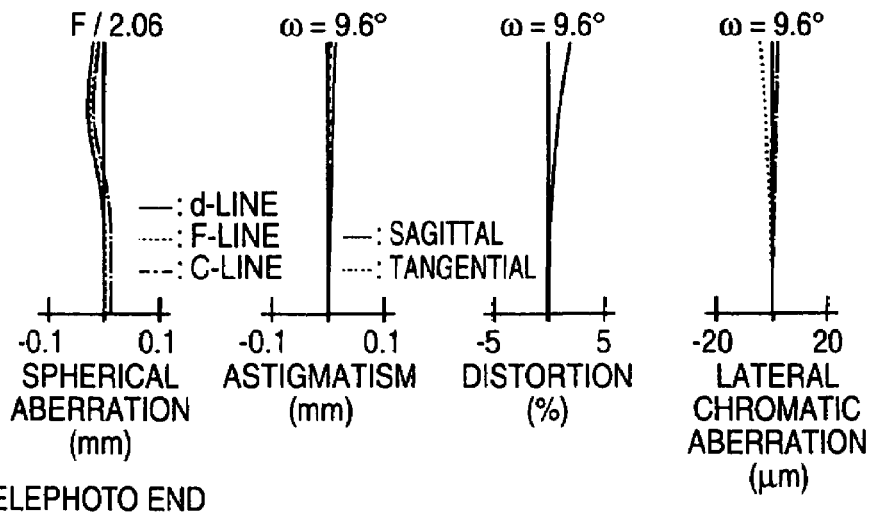
Figure 14:
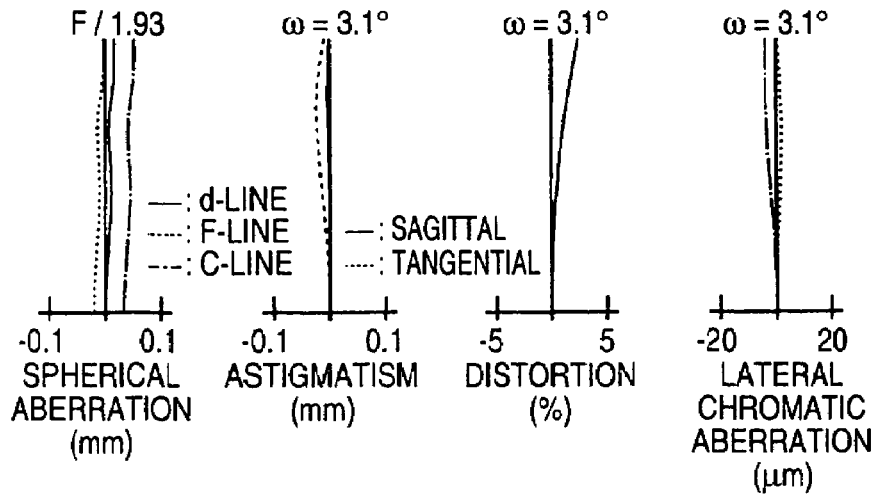

FIG. 14 is aberration diagrams showing various aberrations (spherical, astigmatism, a distortion, and lateral chromatic aberration) at the wide angle end (f=3.40 mm), the middle position (f=10.55 mm), and the telephoto end (f=32.68 mm) in the zoom lens capable of image stabilization according to the example 5.

Figure 15:
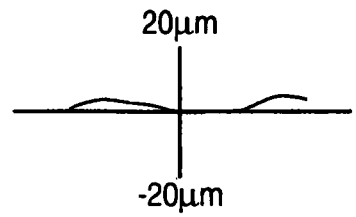
FIG. 15 is aberration diagrams showing lateral aberrations (at the image heights Y of 1.27, 0, and −1.27) at the time of normal and at the time of correcting the blurring at 0.3 degree at the telephoto end of the zoom lens capable of image stabilization according to the example 5.
Figure 15:
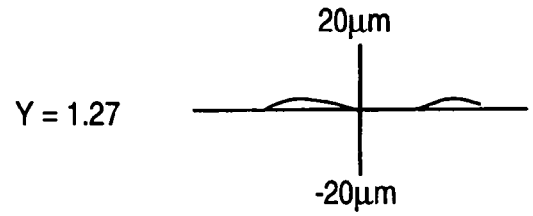
Figure 15:
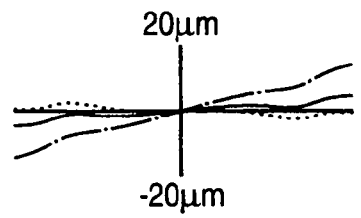
Figure 15:
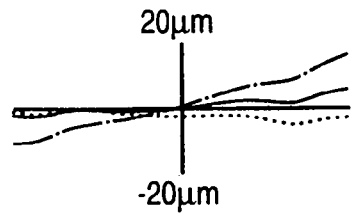
Figure 15:
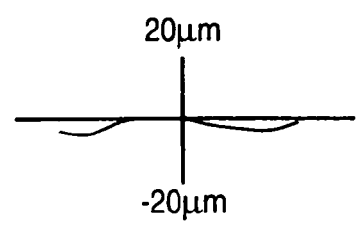
Figure 15:
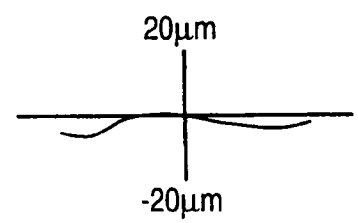

FIG. 15 is aberration diagrams showing lateral aberrations (at the image heights Y of 1.27, 0, and −1.27) at the time of normal and at the time of correcting blurring at 0.3 degree at the telephoto end of the zoom lens capable of image stabilization according to the example 5.

As is apparent from FIGS. 14 and 15, a good aberration correction is made across the entire zoom area according to the zoom lens capable of image stabilization according to the example 5.

According to this embodiment, the parallel eccentric shift amount of the correction lens group at the time of correcting blurring at 0.3 degree at the telephoto end was 0.36 mm.

All the above-described conditional expressions (1) to (4) and (7) are satisfied as shown in Table 11.

TABLE 11

|  | Example 1 | Example 2 | Example 3 | Example 4 | Example 5 |
| --- | --- | --- | --- | --- | --- |
| Conditional Expression (1) | 10.94 | 11.03 | 11.88 | 17.03 | 19.03 |
| Conditional Expression (2) | 0.80 | 0.83 | 0.82 | 0.72 | 0.69 |
| Conditional Expression (3) | 39.0 |  | 40.4 | 40.4 | 40.4 |
| Conditional Expression (4) | 1.85 |  | 1.80 | 1.80 | 1.80 |
| Conditional Expression (5) |  | 11.4 |  |  |  |
| Conditional Expression (6) |  | 1.76 |  |  |  |
| Conditional Expression (7) | 3.95 | 3.98 | 4.07 | 4.08 | 4.09 |

This application claims foreign priority from Japanese Patent Application No. 2007-60783 filed Mar. 9, 2007, the contents of which is herein incorporated by reference.

What is claimed is:

1. A zoom lens capable of image stabilization comprising: in order from an object side of the zoom lens:
    a first lens group having a positive refractive power, the first lens group being fixed when the zoom lens varies a magnification thereof;
    a second lens group having a negative refractive power and being capable of varying a magnification of the zoom lens;
    a stop;
    a third lens group having a positive refractive power, the third lens group being fixed when the zoom lens varies a magnification thereof; and
    a fourth lens group having a positive refractive power, being capable of correcting an image plane variation when the zoom lens varies a magnification thereof, and being capable of focusing the zoom lens,
    wherein the third lens group includes a 3a-th lens group having a positive refractive power, a 3b-th lens group having a negative refractive power, and a 3c-th lens group having a positive refractive power in this order from the object side,
    the 3b-th lens group is adapted to be movable in a direction approximately orthogonal to an optical axis thereof so as to correct blurring of a taken image which is caused by a vibration of the zoom lens, and
    the zoom lens satisfies conditional expressions (1) and (2):

$$8 < f3/fw < 26 \quad (1)$$

$$0.55 < |(\phi 3a + \phi 3c)/(2 \times \phi 3b)| < 0.95 \quad (2)$$

wherein
    fw represents a focal length of the zoom lens at a wide angle end,
    f3 represents a focal length of the third lens group,
    $\phi 3a$ represents a refractive power of the 3a-th lens group, which is a reciprocal of a focal length of the 3a-th lens group,
    $\phi 3b$ represents a refractive power of the 3b-th lens group, which is a reciprocal of a focal length of the 3b-th lens group, and
    $\phi 3c$ represents a refractive power of the 3c-th lens group, which is a reciprocal of a focal length of the 3c-th lens group.

2. The zoom lens capable of image stabilization according to claim 1, wherein the 3b-th lens group includes one single lens or one cemented lens and has at least one aspherical surface.

3. The zoom lens capable of image stabilization according to claim 2, wherein at least one of the 3a-th lens group and the 3c-th lens group includes one plastic lens.

4. The zoom lens capable of image stabilization according to claim 3, further satisfying conditional expression (7):

$$3 < Bfw/fw < 5.5 \quad (7)$$

wherein Bfw represents a back focus at a wide angle end when removing an optical member having no refractive power between an imaging plane and a surface of a lens closest to the imaging plane.

5. The zoom lens capable of image stabilization according to claim 2, further satisfying conditional expression (7):

$$3 < Bfw/fw < 5.5 \quad (7)$$

wherein Bfw represents a back focus at a wide angle end when removing an optical member having no refractive power between an imaging plane and a surface of a lens closest to the imaging plane.

6. The zoom lens capable of image stabilization according to claim 2, wherein when the 3b-th lens group includes the one single lens, the one single lens is a negative lens having a concave surface directed to the object side and the one single lens satisfies conditional expressions (3) and (4):

$$\nu_{3b} > 35 \quad (3)$$

$$n_{3b} > 1.75 \quad (4)$$

wherein
    $\nu_{3b}$ represents an Abbe number of a material of the one single lens at the d-line, and
    $n_{3b}$ represents a refractive index of the material of the one single lens at the d-line.

7. The zoom lens capable of image stabilization according to claim 6, wherein at least one of the 3a-th lens group and the 3c-th lens group includes one plastic lens.

8. The zoom lens capable of image stabilization according to claim 7, further satisfying conditional expression (7):

$$3 < Bfw/fw < 5.5 \tag{7}$$

wherein Bfw represents a back focus at a wide angle end when removing an optical member having no refractive power between an imaging plane and a surface of a lens closest to the imaging plane.

9. The zoom lens capable of image stabilization according to claim 6, further satisfying conditional expression (7):

$$3 < Bfw/fw < 5.5 \tag{7}$$

wherein Bfw represents a back focus at a wide angle end when removing an optical member having no refractive power between an imaging plane and a surface of a lens closest to the imaging plane.

10. The zoom lens capable of image stabilization according to claim 2, wherein when the 3b-th lens group includes the one cemented lens of a positive lens and a negative lens, a most object-side surface of the cemented lens has a concave surface directed to the object side and the one cemented lens satisfies conditional expressions (5) and (6):

$$10 < v_{3bN} - v_{3bP} < 25 \tag{5}$$

$$(n_{3bN} + n_{3bP})/2 > 1.7 \tag{6}$$

wherein
- $v_{3bP}$ represents an Abbe number of a material of the positive lens at the d-line
- $v_{3bN}$ represents an Abbe number of a material of the negative lens at the d-line,
- $n_{3bP}$ represents a refractive index of the material of the positive lens at the d-line, and
- $n_{3bN}$ represents a refractive index of the material of the negative lens at the d-line.

11. The zoom lens capable of image stabilization according to claim 10, wherein at least one of the 3a-th lens group and the 3c-th lens group includes one plastic lens.

12. The zoom lens capable of image stabilization according to claim 11, further satisfying conditional expression (7):

$$3 < Bfw/fw < 5.5 \tag{7}$$

wherein Bfw represents a back focus at a wide angle end when removing an optical member having no refractive power between an imaging plane and a surface of a lens closest to the imaging plane.

13. The zoom lens capable of image stabilization according to claim 10, further satisfying conditional expression (7):

$$3 < Bfw/fw < 5.5 \tag{7}$$

wherein Bfw represents a back focus at a wide angle end when removing an optical member having no refractive power between an imaging plane and a surface of a lens closest to the imaging plane.

14. The zoom lens capable of image stabilization according to claim 1, wherein at least one of the 3a-th lens group and the 3c-th lens group includes one plastic lens.

15. The zoom lens capable of image stabilization according to claim 14, further satisfying conditional expression (7):

$$3 < Bfw/fw < 5.5 \tag{7}$$

wherein Bfw represents a back focus at a wide angle end when removing an optical member having no refractive power between an imaging plane and a surface of a lens closest to the imaging plane.

16. The zoom lens capable of image stabilization according to claim 1, further satisfying conditional expression (7):

$$3 < Bfw/fw < 5.5 \tag{7}$$

wherein Bfw represents a back focus at a wide angle end when removing an optical member having no refractive power between an imaging plane and a surface of a lens closest to the imaging plane.

17. An imaging apparatus comprising a zoom lens capable of image stabilization according to claim 1.

* * * * *